United States Patent
Ben-Dov et al.

(10) Patent No.: US 6,636,310 B1
(45) Date of Patent: *Oct. 21, 2003

(54) WAVELENGTH-DEPENDENT SURFACE CONTOUR MEASUREMENT SYSTEM AND METHOD

(75) Inventors: Shimshon Ben-Dov, Tel-Aviv; Igal Lanzet, K. Bialik; Igor Kuperman, Yokneam, all of (IL)

(73) Assignee: Metroptic Technologies, Ltd., Yokneam (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,514

(22) Filed: May 12, 1998

(51) Int. Cl.$^7$ .............................................. G01B 11/24
(52) U.S. Cl. ...................................................... 356/376
(58) Field of Search ........................................ 356/376

(56) References Cited

U.S. PATENT DOCUMENTS

| | | | | |
|---|---|---|---|---|
| 4,511,252 A | * | 4/1985 | Di Matteo et al. | 356/375 |
| 4,687,325 A | | 8/1987 | Corby, Jr. | 356/1 |
| 4,987,432 A | * | 1/1991 | Landwehr | 356/376 |
| 5,193,120 A | * | 3/1993 | Gamache et al. | 356/376 |
| 5,237,404 A | * | 8/1993 | Tanaka et al. | 356/376 |
| 5,444,537 A | * | 8/1995 | Yoshimura et al. | 356/376 |
| 5,675,407 A | | 10/1997 | Geng | 356/147 |
| 6,028,672 A | * | 2/2000 | Geng | 356/376 |

FOREIGN PATENT DOCUMENTS

| | | |
|---|---|---|
| DE | 1423606 A | 10/1968 |
| DE | 2855877 A | 6/1980 |
| EP | 0403908 A | 12/1990 |
| FR | 2 748 322 | 11/1997 |
| JP | 4-47206 * | 2/1992 ............... 356/376 |
| JP | 10170239 | 6/1998 |
| WO | WO 9108439 | 6/1991 |

OTHER PUBLICATIONS

Tajima, Johji et al. "3–D Data Acquisition by Rainbow Range Finder," from the IEEE 10th International Conference on Pattern Recoginition, vol. 1, pp. 309–313 (1990).

* cited by examiner

Primary Examiner—Richard A. Rosenberger
(74) Attorney, Agent, or Firm—Wolf, Greenfield & Sacks, P.C.

(57) ABSTRACT

An optical metrology system for measuring a contour of a workpiece surface. The system includes a multi-wavelength light projector that projects a wavelength-varying collimated light beam onto the surface of the workpiece. The collimated light beam has a plurality of substantially parallel light rays, each of which has a predetermined wavelength. The wavelength of the plurality of light rays varies in a predetermined manner across a width of the collimated light beam. A wavelength-discriminating detector determines an intensity of light reflected from the workpiece surface and detects wavelength-specific characteristics of the received reflected light. Significantly, the wavelength-specific characteristics of the reflected light are related to the distance of the workpiece surface from the detector. Specifically, the multi-wavelength projector includes a collimated light source that generates a collimated light beam. A wavelength filter in the multi-wavelength projector is operatively positioned adjacent to the collimated light source to filter predetermined wavelengths of certain ones of said plurality of light rays to generate the wavelength-varying collimated light beam. The wavelength discriminating detector includes a photodetector matrix having a plurality of photosensitive elements forming an array of wavelength-sensitive light detector elements. A light receiver of the wavelength discriminating detector projects light reflected from one or more predetermined locations on the workpiece surface onto the photodetector matrix such that wavelength-specific characteristics and intensity information of the reflected light is recorded by the photodetector matrix.

102 Claims, 11 Drawing Sheets

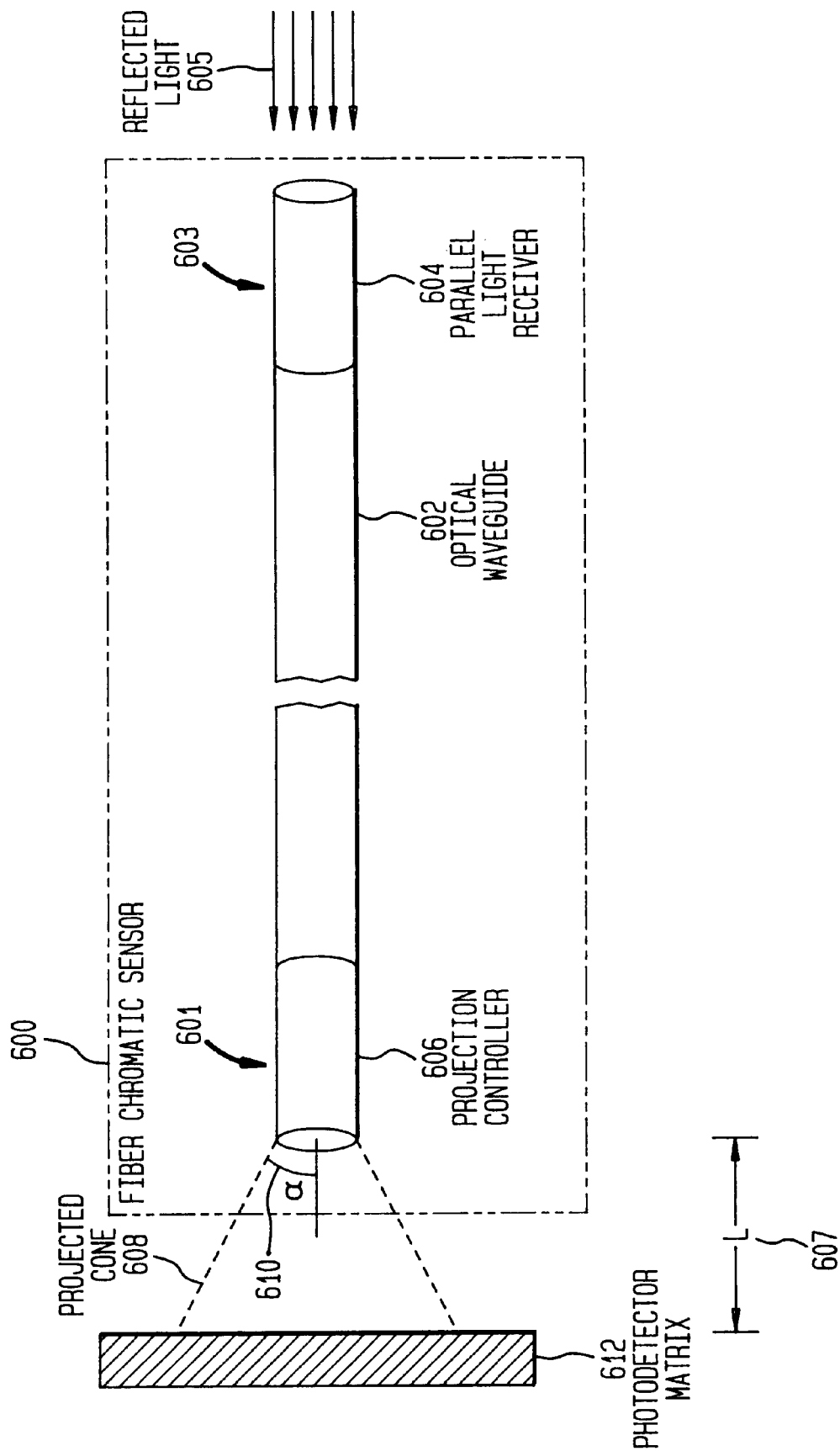

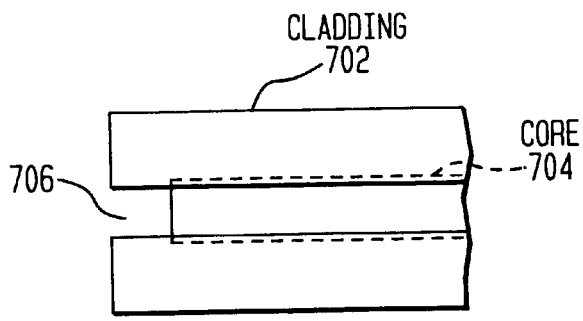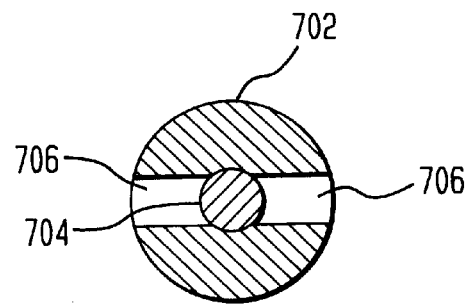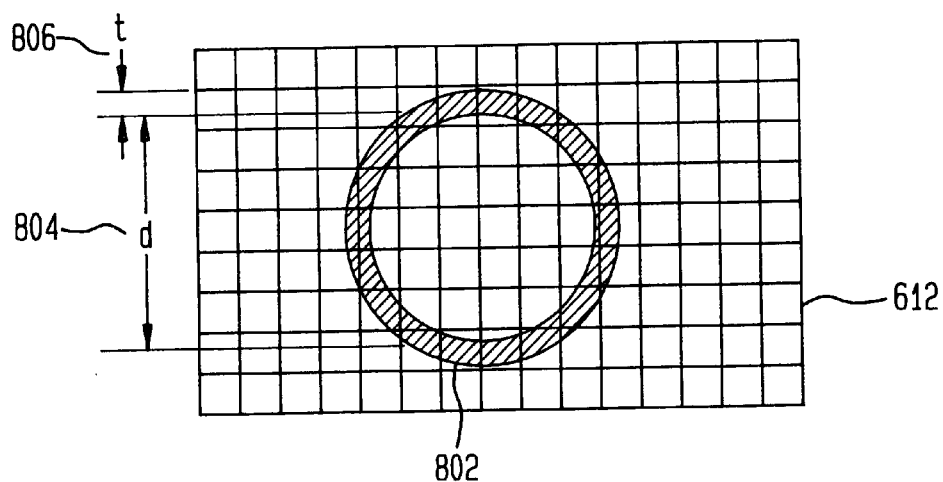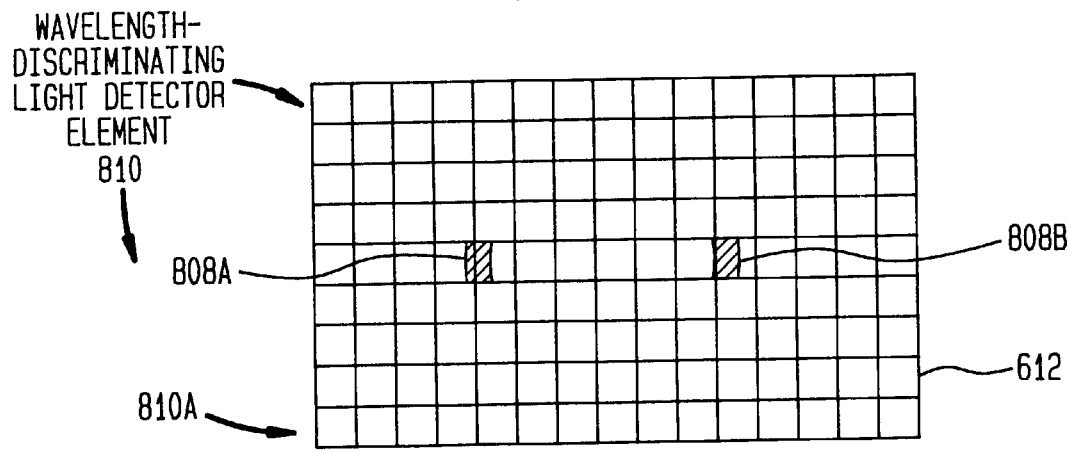

WAVELENGTH-DEPENDENT SURFACE CONTOUR MEASUREMENT SYSTEM AND METHOD

BACKGROUND OF THE INVENTION

1. Field of the Invention

The present invention relates generally to optical metrology and, more particularly, to non-contact surface contour measurement systems and methods.

2. Related Art

Contoured, free-form surfaces and complex part geometries present special manufacturing challenges that have made conventional dimensional metrology approaches unsuitable for providing the necessary degree of control over the manufacturing process to insure that the workpiece dimensions are consistently within tolerances. Contoured, free-form surfaces, which generally have shapes that curve in the three coordinate axes, may be found on automobile bodies and jet engine blades; devices shaped for human use such as telephone hand sets, computer keyboards and tennis rackets; and artificial joints, such as replacement hips and knees. Complex geometries may be found on workpiece surfaces having very small dimensions, such as printed circuit boards, electronic assemblies and intricate machined parts.

In modern metrology it is important to determine not only the true position of a workpiece feature, but also size, run out, flatness, and other dimensional form characteristics of the entire workpiece that can indicate, for example, how well the part will perform as a component in a larger assembly, and how well intricate parts of a larger component have been assembled. Unlike prismatic shapes which require a minimum number of data points to establish dimensional information such as size and location, accurate form measurements require the compilation of a massive number of data points. For example, the diameter of a circle can be defined with a minimum of three data points. Form measurement of a circle, on the other hand, could require as many as 4,000 data points depending upon the level of definition desired.

Coordinate measuring machines (CMMs) have traditionally been used to gather dimensional data for inspection and process control purposes. In particular, scanning CMMs have been developed in response to the need to measure contoured, free-form surfaces. These CMMs automatically collect a large number of data points to define the three-dimensional shape and form of a workpiece or a workpiece feature, and use the information in conjunction with, for example, a CAD system to provide insight into the manufacturing processes. Two common scanning methods are continuous and stitch scanning. Continuous analog scanning is generally performed using an analog scanning probe or a passive probe. Analog probes are used on direct computer control (DCC) CMMs to measure, for example, changes in a workpiece's surface elevation as a proportion of the measuring tip's deflection over its full range. Continuous analog scanning typically sends an analog signal to a computer which processes the signal, converting it into a stream of discrete data points. However, continuous analog scanning probes experience large deflections with minimally-applied forces. Even when used with DCC CMMs, the displacement of analog scanning probes cannot be sufficiently controlled to yield the necessary accuracy to measure intricate and complex workpiece features.

Passive probes, which are generally used in manual CMMs, typically have solid shafts and a large probe tip diameter to reduce errors due to static bending. Unfortunately, conventional passive probes (also referred to as solid or hard probes) have a diameter that is generally too large to be used to measure small features of a workpiece. Furthermore, the diameter of passive probe shafts cannot simply be reduced to accommodate these smaller dimensions. Passive probes have deflections that significantly increase with a corresponding decrease in the diameter of the probe shaft. Thus, reducing the diameter of the passive probe shafts results in significant probe tip deflections. Another drawback of conventional passive probes is that the accuracy of the probes is dependent upon the operator and the speed at which the measurements are performed. As a result, passive probes in manual CMMs are incapable of meeting the requisite accuracy to define form errors of small workpiece features. Also, passive probes cannot be used on DCC CMMs because in such applications the force experienced by the probe is restricted.

In stitch scanning, data is acquired using a switching or touch trigger probe which often includes an electronic or electro-mechanical trigger that generates a signal each time the probe touches a surface of the workpiece. When the probe contacts individual points on a workpiece surface, the probe tip deflects and a switched signal is generated that causes the CMM to provide discrete data points to a controller. The probe tip must then be lifted to break contact with the workpiece surface, moved slightly, and contact reinitiated at another location along a measurement line to collect another measurement point. This approach may be effective for applications requiring a minimum number of data points to be gathered, such as where fairly smooth two-dimensional surfaces prevail. However, for three-dimensional form measurements, the single-point measurement technique, which generally collects data at a maximum rate of approximately 50–60 points per minute on a DCC machine and 20–30 points per minute on a manual scanning machine, cannot practicably collect the requisite number of data points to accurately define form errors. The time required to obtain such measurement points using a switching probe increases the cost of making such measurements due to the increased labor costs and adverse impact on the manufacturing speed. In addition, the time required to make such measurements increases the potential for measurement errors due to, for example, heat expansion during the measurement process.

One conventional approach that has been developed to overcome these limitations of CMMs includes the formation of an image of the workpiece, typically acquired by a video camera. The image is digitized and stored in a computer memory as a set of pixels. The computer then analyzes the image, such as by comparing it, pixel-by-pixel, with a stored reference image. However, there are drawbacks to such conventional techniques. For example, processing of a stored image requires a very large number of calculations. Even with high speed digital computers, processing of many such stored images requires considerable time, thereby limiting the ability of the system to generate immediate, real-time results. Also, the images are often of poor quality due to the inability of such conventional system to accurately obtain high resolution images of the workpiece which, in turn, reduces the accuracy of the resulting measurements.

More recently, other non-contact measurement techniques have been developed to measure surface contours. Such systems have been used to measure workpieces having complex surface configurations, contoured, free-form surfaces, and other complex workpieces such as printed circuit boards and the like. Typically, a single point range sensor using optical triangulation techniques is used to perform non-contact measurements. An illumination source projects a defined area of light onto the surface to be measured. Reflections received from the surface are used to form an image of the light reflected onto a light-sensing detector. As the distance from the sensor to the workpiece surface changes, the position of the reflected image on the detector plane shifts. This lateral shift of image position on the detector is used to measure the distance between the sensor and the surface, thereby providing the dimension of the measured surface.

A drawback to such conventional optical triangulation techniques is that in order to obtain high accuracy, the detector must be able to resolve small lateral shifts in the image position on the detector. This generally requires a high magnification in the direction of travel of the reflected image. However, the sensor is typically separated from the workpiece by a large stand-off distance. As a result, the sensor has a limited range of measurement and must be adjusted in position relative to the workpiece to retain the workpiece within the measurement range. Furthermore, such conventional systems are typically slow, increasing the cost of performing such measurements.

What is needed, therefore, is an apparatus and methodology that is capable of quickly and accurately obtaining multiple measurement points for determining the dimensional form characteristics of contoured, free-form surfaces, highly complex surfaces and workpiece features having very small dimensions.

SUMMARY OF THE INVENTION

The present invention is an improved apparatus and method for rapidly and accurately measuring surface contours of a workpiece. In one aspect of the invention, an optical metrology system for measuring a contour of a workpiece surface is disclosed. The system includes a multi-wavelength light projector that projects a wavelength-varying collimated light beam onto the surface of the workpiece. The collimated light beam has a plurality of substantially parallel light rays, each of which has a predetermined wavelength. The wavelength of the plurality of light rays varies in a predetermined manner across a width of the collimated light beam. A wavelength-discriminating detector determines an intensity of light reflected from the workpiece surface and detects wavelength-specific characteristics of the received reflected light. Significantly, the wavelength-specific characteristics of the reflected light are related to the distance of the workpiece surface from the detector.

Specifically, the multi-wavelength projector includes a collimated light source that generates a collimated light beam. A wavelength filter in the multi-wavelength projector is operatively positioned adjacent to the collimated light source to filter predetermined wavelengths of certain ones of said plurality of light rays to generate the wavelength-varying collimated light beam.

More specifically, the collimated light source includes a light source that emits light having a plurality of wavelengths, and a collimator constructed and arranged to collimate the emitted light so as to generate the collimated light beam. Preferably, the light source is a white light source. In one embodiment, the collimator is a cylindrical lens. In an alternative embodiment, the collimator is a parabolic mirror.

In one preferred embodiment, the wavelength filter dynamically filters the collimated light beam. In such embodiments, the wavelength filter comprises a means for dynamically controlling a plurality of optical filters such that the filters temporally filter the collimated light beam. In one embodiment, the controlling means is a tunable liquid crystal display filter or other device that electronically controls the plurality of optical filters. Alternatively, the controlling means may mechanically control a plurality of physical optical filters. The wavelength filter may filter the collimated light beam such that the wavelength-varying collimated light beam comprises light rays with wavelengths that vary linearly or non-linearly across the light beam. In one particular embodiment, the wavelength filter comprises a color filter that filters the collimated light such that the wavelength-varying collimated light comprises light rays which vary from approximately 400 to 700 nanometers (nm). In one particular embodiment, the detector is constructed and arranged to discriminate to one (1) nm of resolution of light reflected from the workpiece surface.

In one alternative embodiment, the wavelength filter includes two electronically-controlled color filters operatively arranged to successively filter the collimated light beam. In this embodiment, a first filter passes a single, predetermined wavelength of the collimated light. The predetermined wavelength is temporally varied using any well known electronic control. A second electronic filter is operatively positioned to receive the filtered light. The second filter passes a range of predetermined wavelengths through a narrow region of the filter which is electronically controlled so as to be positioned at different locations along the second filter. The position of the narrow region along the second filter is controlled synchronously with the change in the wavelength passed by the first filter. This results in the wavelength filter generating a narrow beam of collimated light having a wavelength that varies across its width.

Generally, the wavelength discriminating detector includes a photodetector matrix having a plurality of photosensitive elements forming an array of wavelength-sensitive light detector elements. A light receiver of the wavelength discriminating detector projects light reflected from one or more predetermined locations on the workpiece surface onto the photodetector matrix such that wavelength-specific characteristics and intensity information of the reflected light is recorded by the photodetector matrix.

In one particular embodiment, the light receiver is a fiber chromatic sensor which includes a plurality of optical waveguides each of which receives and projects a portion of the reflected light onto an associated one of the light detector elements of the photodetector matrix. Preferably, the fiber chromatic sensor includes a parallel light receiver coupled to the input end of each of the optical waveguides. The parallel light receiver receives light rays of the reflected light which are substantially parallel with an axis of the input end of the optical waveguide. In one embodiment, the parallel light receiver is a hemispherical lens formed on the input end of the optical waveguide. Alternatively, the parallel light receiver is a variable refractive index light guide having a predetermined length so as to form a parallel light accepting receiver.

The fiber chromatic sensor preferably includes a projection controller operatively coupled to an output end of each of the plurality of optical waveguides. The projection controller projects light transferred through the optical waveguide onto the associated light detector element of the photodetector matrix. Preferably, the projection controller projects the light such that a substantial portion of the projected light is detected only by the associated wavelength discriminating light detector. In one embodiment, the projection controller is formed by selectively removing a portion of the cladding at the output end of the optical waveguide.

In one embodiment, the wavelength discriminating detector includes a photodetector matrix including a plurality of photosensitive elements arranged in columns and rows. Photosensitive elements of each column are configured to detect light having a same range of wavelengths while photosensitive elements in each of the rows detect light having a different range of wavelengths. One or more rows of the photosensitive elements form a wavelength-sensitive detector. A focussing lens projects light reflected from locations on the workpiece surface onto an associated wavelength-sensitive detector of said photodetector matrix. In one specific embodiment, the photodetector matrix includes three columns of photosensitive elements. A first column of photodetector elements detects a broad range of wavelengths centered approximately about the wavelength associated with the color red. A second column of photodetector elements detects a broad range of wavelengths centered approximately about the wavelength associated with the color green. A third column of photodetector elements detects a broad range of wavelengths centered approximately about the wavelength associated with the color blue.

In another embodiment, the wavelength discriminating detector includes a photodetector matrix including a plurality of photosensitive elements arranged to form a plurality of wavelength-sensitive detectors. A light receiver, including a prism and a column of microlenses, projects light reflected from locations on the workpiece surface onto one of the plurality of wavelength-sensitive detectors associated with each surface location. Wavelength-specific characteristics and intensity information of the reflected light is recorded by the wavelength-sensitive detectors.

In one embodiment, the wavelength discriminating detector includes a plurality of photosensitive elements arranged in a column so as to receive light reflected from a substantially parallel surface of the workpiece surface. The wavelength discriminating detector also includes an electronically-controlled filter interposed between the column of photosensitive elements and the object surface. The filter allows a single wavelength of reflected light to pass through the filter to the photosensitive elements. The wavelength of the light which is passed through the filter is temporally varied in a predetermined manner. A column of microlenses arranged substantially parallel with the column of photosensitive elements is also included in the detector interposed between the filter and the object surface. Each microlens in the column of microlenses focuses the light reflected from the object surface onto an associated photosensitive element in the column of photosensitive elements. In one embodiment, the column of photosensitive elements is a line CCD.

In an alternative embodiment, the wavelength discriminating detector includes an array of photosensitive elements arranged in a column so as to receive light reflected from a substantially parallel surface of the workpiece. An electronically-controlled filter is interposed between the array of photosensitive elements and the object surface. The filter allows a single wavelength of reflected light to pass through the filter to the array of photosensitive elements. This wavelength is varied in a predetermined manner over time. An array of microlenses in the wavelength discriminating detector is arranged substantially parallel with the array of photosensitive elements. The array of microlenses is interposed between the filter and the object surface. Each microlens in the array of microlenses focuses the reflected light from the object surface onto an associated photosensitive element in the array of photosensitive elements.

Advantageously, the present invention does not require physical movement of any device or component during a scan of the workpiece surface. Eliminating such operations enables the present invention to provide measurement data significantly faster than the above and other conventional metrology, scanning, imaging or dimensional measurement systems. Furthermore, such static scanning increases the accuracy of the resulting measurements since the errors associated with the physical positioning and control of the measurement system components is eliminated.

Another advantage of the present invention is that, depending upon the complexity of the workpiece surface and other factors, the present invention can obtain measurement data of a workpiece surface as the relative position of the workpiece and the optical sensor assembly continuously changes, thereby decreasing the time necessary to completely measure the surface or dimension.

A further advantage of the present invention is that it generates wavelength-discriminated measurement data, providing for increased measurement accuracy which may be scaled with the invention for different applications. For example, the present invention may be scaled to measure very intricate parts such as components and features of a printed circuit board or electronic assembly. Alternatively, the present invention may be increased in scale to measure larger workpieces such as contoured, free-form automotive body parts.

Further features and advantages of the present invention as well as the structure and operation of various embodiments of the present invention are described in detail below with reference to the accompanying drawings.

BRIEF DESCRIPTION OF THE DRAWINGS

This invention is pointed out with particularly in the appended claims. The above and other advantages of this invention may be better understood by referring to the following description when taken in conjunction with the accompanying drawings in which similar reference numerals indicate the same or similar elements or method steps. In the drawings, like reference numerals indicate like or functionally similar elements and steps. Additionally, the leftmost one or two digits of a reference numeral identify the figure in which the reference numeral first appear.

FIG. 6 is a side perspective view of one embodiment of the wavelength discriminating detector including a fiber chromatic sensor (FCS).

FIG. 7A is a side view of one embodiment of the projection controller illustrated in FIG. 6.

FIG. 7B is an end view of one embodiment of the dispersion controller illustrated in FIG. 6.

FIG. 8A is a perspective view of a photodetector matrix whereupon a cone of light is projected onto the matrix by one embodiment of the fiber chromatic sensor illustrated in FIG. 6.

FIG. 8B is a perspective view of the photodetector matrix illustrated in FIG. 6 whereupon a restricted image of light is projected onto one wavelength-discriminating light detector element by one embodiment of the fiber chromatic sensor shown in FIG. 6 that includes a projection controller.

DETAILED DESCRIPTION

Figure 1:
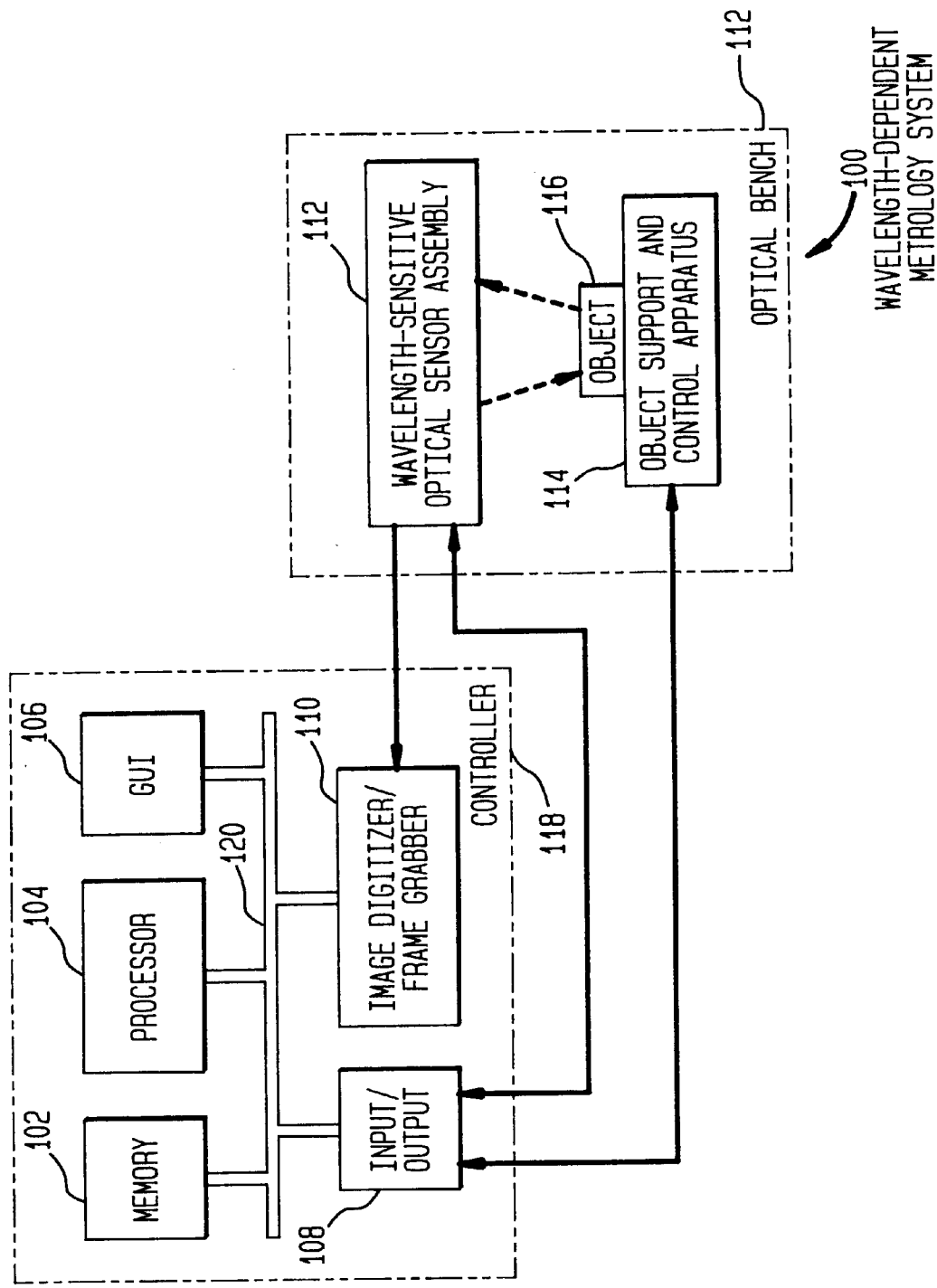
FIG. 1 is a functional block diagram of one embodiment of the wavelength-dependent metrology system of the present invention.

FIG. 1 is a functional block diagram of one embodiment of the wavelength-dependent metrology system of the present invention. The system 100 broadly includes a wavelength-sensitive optical sensor assembly 112 configured in accordance with the present invention to provide high speed scanning measurements of a workpiece 116 secured to a workpiece support and control apparatus 114. A controller 118 coupled to the optical assembly 112 and support and control apparatus 114 controls the operation of the system 100 and generates dimensional information such as height information of a surface of the workpiece 116 based upon scanning data obtained by the wavelength-sensitive optical sensor assembly 112.

Certain workpieces, such as dies, require the dimensions of only one surface to be verified or measured. Accordingly, in some embodiments of the present invention, a single optical assembly 112 is used to measure the surface contour on the side of interest of the workpiece. However, cross-sectional dimensions of more complex workpieces, such as turbine blades, are desired. Accordingly, in accordance with one embodiment of the present invention and as will be described in detail below, multiple optical assemblies 112 may be arranged on opposing sides of the workpiece 116 so as to image opposing surfaces of a predetermined section of the workpiece. This information is then provided to the controller 118 for calculating cross-sectional dimensions of the workpiece. In addition, certain workpieces such as printed circuit boards have very complex shapes which require an arrangement of optical sensor assemblies 112 to image the complex surfaces from different perspectives. As with obtaining cross-sectional dimensions of the workpiece, the resulting image data is provided to the controller 118 for calculating the surface contour of such complex workpiece surfaces.

The optical assembly 112 and workpiece support and control apparatus 114 operate in conjunction with each other to image predetermined sections of the workpiece 116 in accordance with the present invention. The relative position of the workpiece 116 and optical sensor assembly 112 is adjusted to measure one or more desired surfaces or sections of the workpiece 116. One example of a suitable optical support and control apparatus 114 is described in commonly-owned U.S. patent application Ser. No. 09/039, 342 entitled "Apparatus and Method for Optically Measuring an Object Surface Contour" filed on Mar. 13, 1998, the specification of which is hereby incorporated by reference in its entirety.

The controller 118 generally includes an image digitizer/frame grabber 110 electrically coupled to the optical sensor assembly 112. The image digitizer/frame grabber 110 samples and digitizes the input images from a photodetector matrix contained within the optical assembly 112 as described below. The frame grabber 110 places each acquired image into a frame buffer having storage elements each of which may consist of a number of bits representing the brightness of that location of the image. The image digitizer/frame grabber 110 may be any conventional frame grabber electronics now or later developed. Alternatively, the image digitizer/frame grabber 110 may comprise a vision processor as is well known in the art.

The control and operation of the wavelength-dependent metrology system 100 may be programmed at memory 102 to include programs for image processing and/or image analysis which are run on a processor 104, as is well known in the art. Any known application software may be used to process this information to product the final coordinate information of the workpiece surface or cross-section. A graphical user interface 106 is also preferably provided to display images of the workpiece surface or cross-section on a monitor (not shown).

The controller 118 is typically a computer-based system and includes a system bus 120 that receives information from the image digitizer/frame grabber 110 and passes the information to the processor 104 which may be any well known processor now or later developed that is compatible with the optical sensor assembly 112 and workpiece support and control apparatus 114. The system bus 120 may be, for example, a PCI, EISA, ISA or VL bus or any other standard or non-standard computer bus.

The optical sensor assembly 112 and workpiece support and control apparatus 114 are generally constructed on an optical bench 122 of any well known configuration. If required, the optical bench 122 may be passively suspended on an anti-vibration base to minimize adverse environmental effects. In the following description, the system 100 is constructed and operated in accordance with the present invention to inspect at least a portion of one surface of the workpiece 116. As noted, the workpiece 116 may be any workpiece for which surface contour or other types of dimensional information may be desired. As used herein, the term "surface" includes any workpiece surface, including surfaces that are flat, contoured, free-form surfaces and surfaces that have a very irregular or complex configuration.

Figure 2:
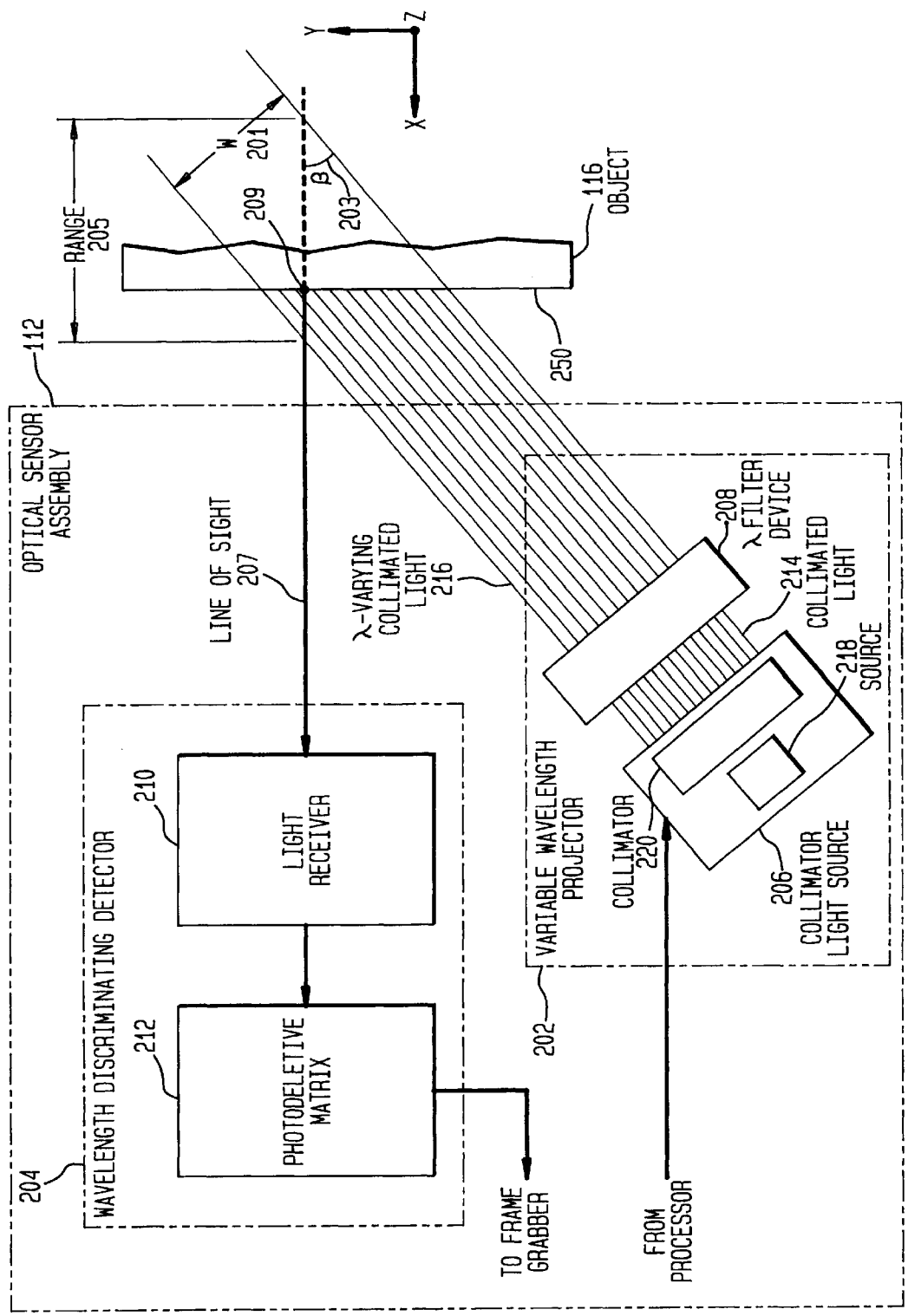
FIG. 2 is a top schematic block diagram of the primary components comprising one embodiment of the wavelength-sensitive optical sensor assembly illustrated in FIG. 1.

FIG. 2 is a structural block diagram showing a top view of one embodiment of the wavelength-sensitive optical sensor assembly 112 introduced above with reference to FIG. 1. The optical sensor assembly 112 generally includes a variable wavelength projector 202 and a wavelength-discriminating detector 204. The variable wavelength projector 202 projects a wavelength-varying collimated beam of light 216 onto a selected portion of the workpiece surface 250. The workpiece 116 is preferably positioned such that the measured surface 250 is substantially parallel with the Y-axis, although other orientations are possible. As used herein, the term "collimated" refers to a beam of light which has substantially parallel light rays in a particular plane. Here, the light is collimated in at least the X-Y plane. In a direction substantially parallel with the Z-axis, the light beam 216 diverges or is also collimated, as will be described in detail below. This allows light having a constant wavelength to illuminate portions of the workpiece surface 250 which are substantially parallel with the Z-axis. Light reflected off of the surface 250 is received by the wavelength-discriminating detector 204. The detector 204 determines the intensity and the wavelength of the reflected light for processing by the controller 118. The wavelength-discriminating detector 204 has a line of sight 207 defining the X-axis, intersecting the workpiece surface 250 at a point 209 identifying the portion of the workpiece surface 250 which is currently being measured.

The wavelength discriminating detector 204 is therefore able to measure the position of the surface of the object 116 in the X-axis over a range 205. The resolution of the measurement will depend on the ability of the detector 204 to discriminate different wavelengths and the rate of variation in wavelength across the light beam 216. For example, in one embodiment, the wavelength discriminating detector 204 discriminates to 1 nm and the wavelength varies linearly from 400 nm to 700 nm across the light beam 216. In such an embodiment, the resolution of measurement of the position of the surface of the object 116 is 1/300 (range 205).

The variable wavelength projector 202 includes a collimated light source 206 that generates a collimated light beam 214 having a plurality of substantially parallel light rays. The variable wavelength projector 202 also includes a wavelength filter device 208 that selectively filters the collimated light 214 at predetermined locations across the width (w) 201 of the collimated light beam 214 so as to generate a light beam 216 having substantially parallel light rays, at least some of which have different wavelengths. As will be explained in detail below, the wavelength of the light rays in collimated light beam 216 varies linearly or non-linearly in a predetermined manner.

The collimated light source 206 is an optical apparatus that generates the collimated light beam 214. Generally, the collimated light source 206 includes a light source 218 and a collimator 220. The light source 218 may be any light source now or later developed, and is preferably a white light source. However, any well known light source that generates light at appropriate wavelengths for projection onto a particular workpiece surface 250 may be used. The collimator 220 may be any optical device now or later developed that renders the divergent light rays emanating from the light source 218 parallel. As noted, the collimated light beam 214 generated by the collimator 220 is collimated in at least the X-Y plane.

Figure 3:
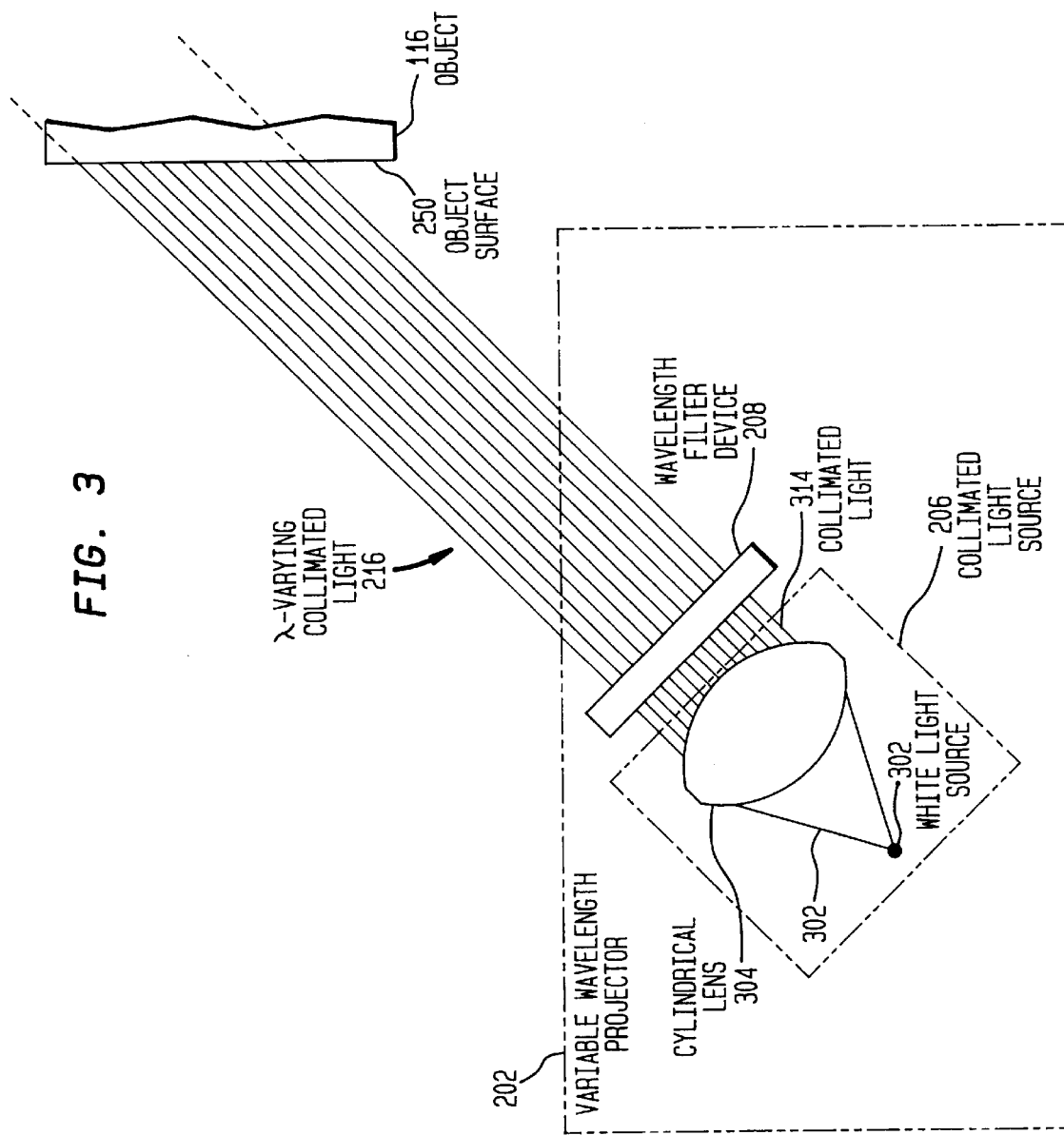
FIG. 3 is a schematic diagram showing a top view of one embodiment of the variable wavelength projector illustrated in FIG. 2.

FIG. 3 is a top schematic view of one embodiment of the variable wavelength projector 202 shown in FIG. 2. In this embodiment, the collimated light source 206 includes a cylindrical lens 304 that collimates the divergent light 303 generated by a white light source 302. The cylindrical lens 304 generates a collimated light beam 314 that diverges in a plane perpendicular to the plane in which the light is collimated. In the illustrative embodiment shown in FIG. 3, the light beam 314 is collimated in the X-Y plane and diverges in the Y-Z plane. The collimated light beam 314 is filtered by a wavelength filter device 208 described below to generate the wavelength-varying collimated light beam 216 introduced above. Thus, each light ray in the wavelength-varying collimated light beam 216 illuminates a vertical portion of the workpiece surface 250.

Figure 4:
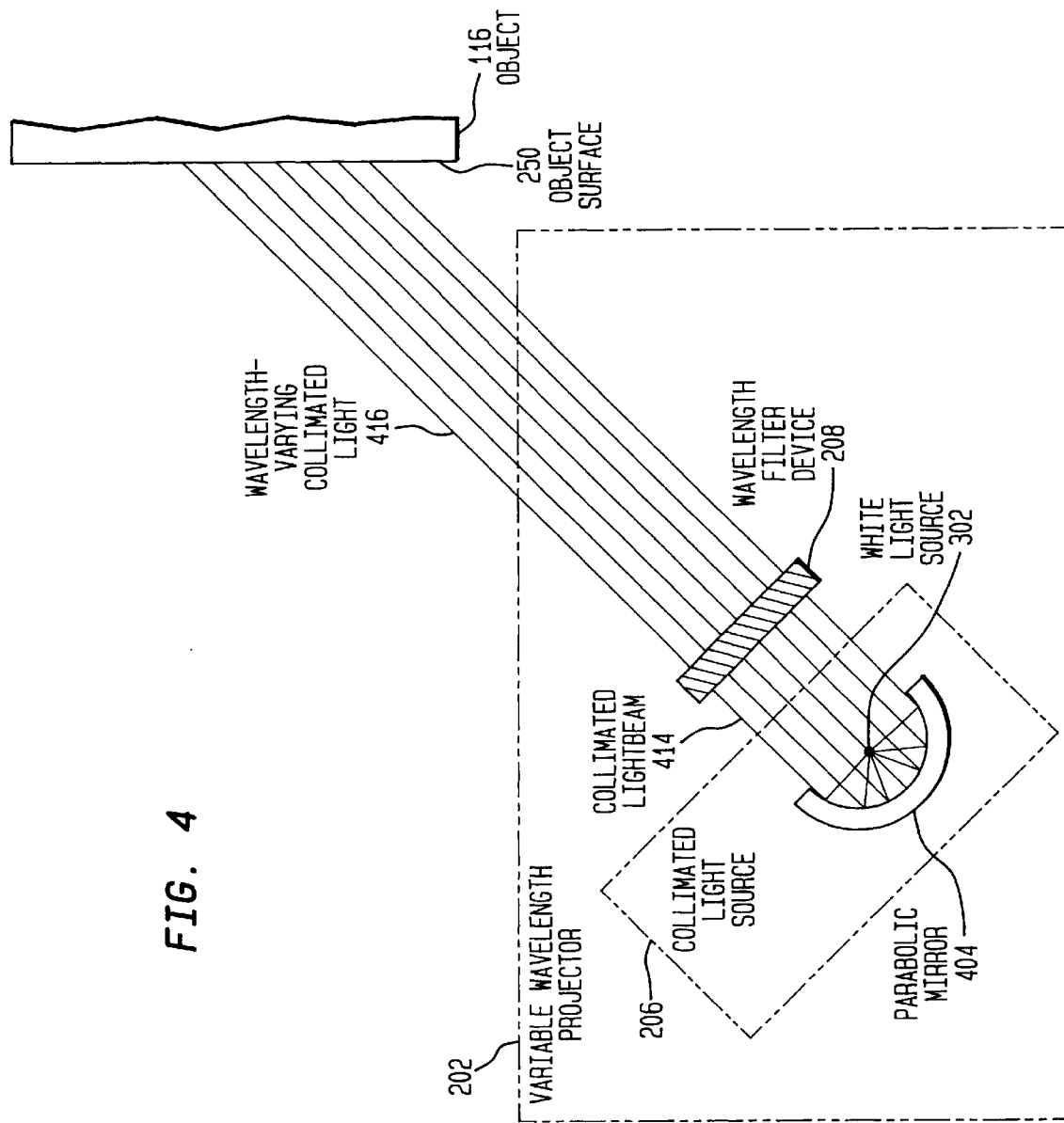
FIG. 4 is a schematic diagram showing a top view of another embodiment of the variable wavelength projector illustrated in FIG. 2.

FIG. 4 is a top schematic view of another embodiment of the variable wavelength projector 202. In this embodiment, the collimated light source 206 includes a parabolic mirror 404 constructed and arranged so as to collimate the divergent light generated by the white light source 302. The parabolic mirror 404 is configured so as to cause the collimated light source 206 to generate a light beam 414 that is collimated in both the X-Y plane and the Y-Z plane.

The strength of the cylindrical lens 304 illustrated in FIG. 3 may depend on the wavelength of light passing through it, causing the lens 304 to focus different wavelength light at a slightly different distance. Such variations in focal length for different wavelengths are known as chromatic aberrations. Accordingly, in certain applications, the parabolic mirror 404 shown in the embodiment illustrated in FIG. 4 may be preferable in that it does not generate substantial chromatic aberrations that may be generated by lenses such as cylindrical lens 304.

However, the use of the parabolic mirror 404 requires the use of a large wavelength filter device 208 to filter the collimated light beam 414 which is collimated in the Y-Z plane. This increases considerably the cost of the variable wavelength projector 202. On the other hand, such costs may be willingly incurred to avoid or reduce chromatic aberrations, depending upon the application of the present invention. Such trade-offs are considered to be design considerations apparent to one of ordinary skill in the relevant art.

Furthermore, as one skilled in the relevant art would find apparent, other collimators now or later developed may be used. For example, achromatic doublets, which are lenses of two different materials cemented together such that the chromatic effects of each lens is reversed by the other lens, may be used. Such lenses form an optical device which is virtually free of chromatic aberrations.

As noted, the wavelength filter device 208 selectively filters the collimated light 214 across its width 201 so as to generate a light beam having substantially parallel light rays, at least some of which have different wavelengths. As shown in FIGS. 2–4, the optical filter 208 is arranged so as to filter light rays in the X-Y plane so that the wavelength-varying collimated light beam 216 which is projected onto the workpiece surface 250 has a wavelength which varies across the width (w) 201 and, hence, across the surface 250 of the workpiece 116 which is being measured.

Figure 5A:
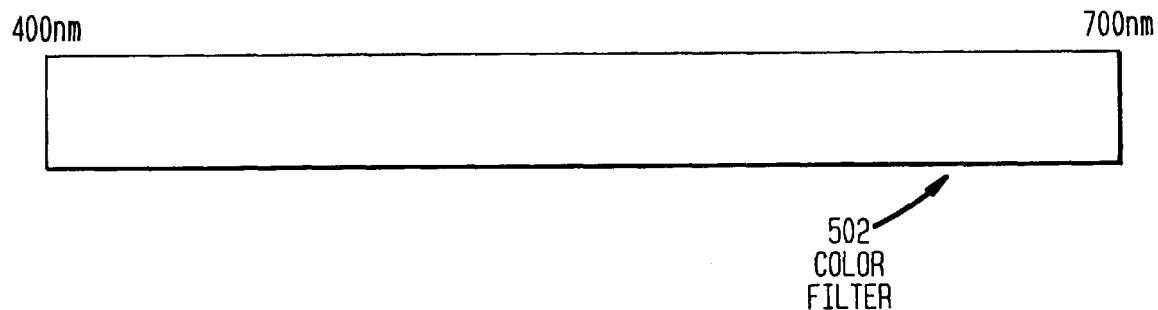
FIG. 5A is a schematic diagram of one embodiment of a color filter which may be used in the wavelength filter device 208 illustrated in FIGS. 2–4.

A schematic diagram of one embodiment of the wavelength filter device 208 is illustrated in FIG. 5A. In this exemplary embodiment, a color filter 502 filters the collimated light 214 so as to create the wavelength-varying collimated light beam 216 having light rays with wavelengths which linearly vary approximately from 400 to 700 nanometers (nm). In one embodiment described below, the detector 204 measures the collimated light beam 214 in one (1) nm increments. In such an embodiment, the resolution of the measurement system is 1/300 (700–400 nm) of the range 205. As one skilled in the relevant art would find apparent, the color filter 502 may filter the wavelength of the collimated light in any size increments and in any range of wavelengths.

To provide greater resolution, the wavelength filter device 208 preferably includes more than one optical filter, each having different filtering characteristics. In such an embodiment, these multiple filters are operatively positioned so that each filter filters the collimated light beam 214 at different times during a measurement. Accordingly, in one preferred embodiment, the wavelength filter device 208 dynamically filters specific light rays of the collimated light beam 214 to pass different wavelength light rays at the same position in the light beam 216 at different times.

Figure 5B:
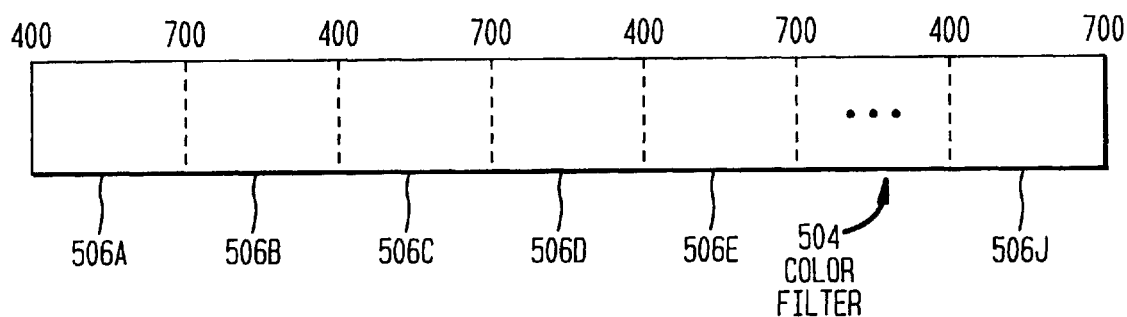
FIG. 5B is a schematic diagram of another embodiment of a color filter which may be used in conjunction with or separate apart from the color filter illustrated in FIG. 5A in the wavelength filter device.

FIG. 5B is a schematic diagram of a second color filter 504 that may be used in conjunction with the color filter 502 in alternate embodiments of the wavelength filter device 208. The filter 504 includes multiple windows or regions 506A–506J (collectively and generally referred to as regions 506), each filtering the collimated light 214 across a specific wavelength range. In the illustrative embodiment, each region 506 has a range of 400–700 nm. Since there are ten such regions in this embodiment of the filter 504, the wavelength filter device 208 provides a resolution of 1/3000 nm of the range 250 in the embodiment where the detector 204 can discriminate to one nm of resolution. For example, if the light beam 216 is 30 mm wide and it strikes the Y-axis at 45°, then the range 205 will be 30 mm/sin45=42.4 mm. The resolution of the measuring system in the X-axis will then be 42.4 mm/300=0.14 mm. Implementation of the second filter 506 will provide a resolution 10 times greater than that of the first since it has a wavelength range of 400–700 nm across each tenth of its width rather than across the whole width as with filter 502. Thus, in such an embodiment, the filter 502 may be used to determine which of the ten regions of the second filter 506 is illuminating the portion of the object surface that is being measured.

In operation, the wavelength filter device 208 dynamically controls the filters 502 and 504 in any well known manner, such as a through the implementation of mechanical or electronic techniques now or later developed. For example, in one embodiment, the wavelength filter device 208 includes a tunable liquid crystal display (LCD) filter that is electronically controlled so as to interpose different wavelength filters between the collimated light source 206 and the workpiece surface 250. In an alternative embodiment, the wavelength filter device 208 implements a mechanical device that rotates or otherwise positions different filters between the collimated light source and the workpiece 116.

Figure 5C:
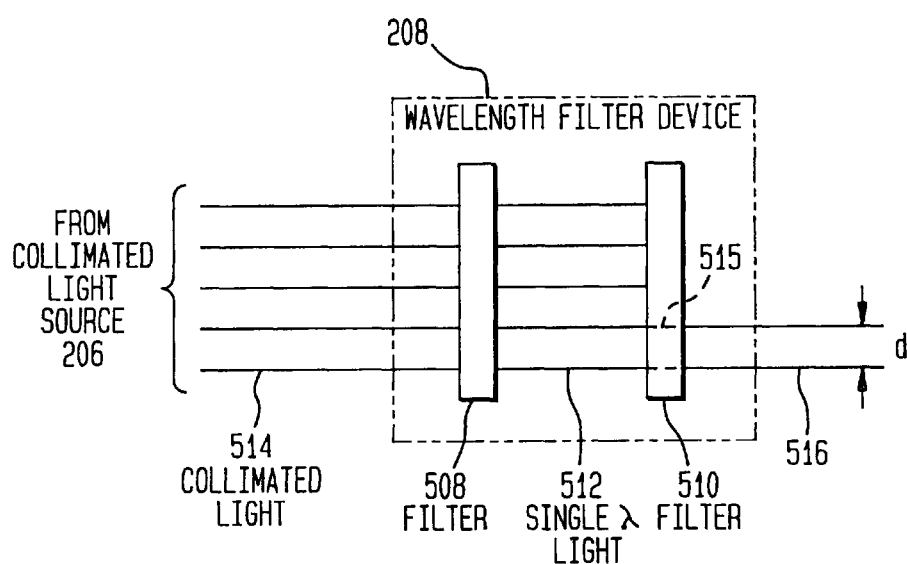
FIG. 5C is a perspective view of an alternative embodiment of the wavelength filter device illustrated in FIG. 2 comprising multiple, electronically-controlled filters.

FIG. 5C is a perspective view of an alternative embodiment of the wavelength filter device illustrated in FIG. 2 comprising multiple, electronically-controlled color filters. In this embodiment collimated light 514 from the collimated light source 206 is received by the wavelength filter device 208 as described above. The wavelength filter device 208 includes 2 filters 508 and 510 which successively filter the collimated light 514. Filter 508 passes a single wavelength over its entire length, generating single wavelength ($\lambda$) light beam 512. As noted, the filter 508 is an electronically controlled filter. As such, the value of the wavelength which is passed through the filter 508 may be changed over time using any well known electronic control. The second filter 510 is arranged adjacent to the filter 508 so as to receive the single wavelength light 512. The second electronic filter 510 passes a predetermined range of wavelengths through a narrow slot 515. The position of the slot 515 is electronically controlled and may be dynamically positioned at any location along the length of the filter 510. Preferably, in operation, the slot 515 is scanned across the filter 510 in synchronism with the changing wavelength passed by the filter 508. This results in a beam 516 having a wavelength which varies across its width (d).

As one skilled in the relevant art would find apparent, any number of optical filters may be used, and may be controlled in any manner using any device suitable for a particular application. Factors which may be considered in the selection of the filters and controlling devices include, for example, the speed of measurements which are to be taken, the desired accuracy of the measurements and the complexity of the workpiece 250 which is to be measured. These and other factors are design considerations within the skill of one of ordinary skill in the relevant art.

As noted, the wavelength discriminating detector 204 determines the intensity and wavelength-specific characteristics of the light reflected from the workpiece surface 250. The frame grabber 110 retrieves and stores this information for use by the controller 118 to determine local surface elevations based upon the intensity and wavelength-specific characteristics of the light reflected from the surface. Should multiple optical assemblies 112 be implemented in a particular application, then the controller 118 may also determine additional characteristics of the workpiece, including cross-sectional dimensional information. Referring again to FIG. 2, the wavelength-discriminating detector 204 generally includes a photodetector matrix 212 having a plurality of photosensitive elements. The wavelength discriminating detector 204 also includes a light receiver 210 that projects reflected light onto the photodetector matrix 212 such that the wavelength-specific characteristics and intensity of the light reflected from predetermined locations on the workpiece surface 250 are determinable.

FIG. 6 is a side perspective view of one preferred embodiment of the light receiver 210 referred to herein as a fiber chromatic sensor (FCS). As shown in FIG. 6, in this embodiment, the light receiver 210 and photodetector matrix 212 are a fiber chromatic sensor 600 and photodetector matrix 612, respectively. The fiber chromatic sensor 600 includes a plurality of optical waveguides 602, each of which projects an image 608 of light onto the photodetector matrix 612, the characteristics of which are dependent upon the wavelength of the reflected light received by the optical waveguide 602.

Each optical wave guide 602 of the fiber chromatic sensor 600 includes a parallel light receiver 604 operatively coupled to a receiving or input end 603 of the optical waveguide 602. The optical waveguide 602 also preferably includes a projection controller 606 formed at the output or projecting end 601 of the optical waveguide 602. The parallel light receiver 604 is constructed and arranged to receive only light that is substantially parallel with the axis of the input end 603 of the waveguide 602. The optical waveguide 602 transfers parallel light received at the parallel light receiver 604 to the output end 601 of the optical waveguide 602 for projection onto the photodetector matrix 612.

The fiber chromatic sensor 600 provides a linear arrangement of a plurality of optical waveguides 602. Since only light that is substantially parallel to the axis of the waveguide 602 is collected through each receiver 604, by positioning the fiber chromatic sensor 600 adjacent to the surface 250 of the workpiece 116 that is desired to be measured, the light received by each of the optical waveguides 602 is reflected off an adjacent and, therefore, known portion of the workpiece surface 250. As one skilled in the relevant art would find apparent, the distance between the input end 603 of the optical waveguides 602 and the workpiece surface 250 which is to be measured is determined by the cone angle acceptance of the parallel light receiver 604. In one embodiment, the parallel light receiver 604 is a variable refractive index light guide cut to a controlled length to form a parallel light accepting receiver. One such light guide is created by forming a hemispherical lens on the input end 603 of each of the optical waveguides 602. The hemispherical lens may be created, for example by dipping the input end 603 of the optical waveguide 602 into a material having a predetermined refractive index which is different than that of the optical waveguide 602. In one preferred embodiment, the parallel light receiver 604 is a Selfoc® optical device cemented or otherwise operationally secured to the input end 603 of the optical waveguides 602. (Selfoc® is a registered trademark of the NSG America, Inc., a subsidiary of Nippon Sheet Glass Co., Ltd., Japan.)

As noted, the photodetector matrix 612 is an array of photosensitive elements. As will be explained in detail below, predetermined row or rows of photodetector elements in the photodetector matrix 612 serve to discriminate between wavelengths. As such, each such row or rows of the photodetector matrix 612 is referred to herein as a wavelength discriminating light detector element. FIG. 8A is a perspective view of an exemplary image 802 appearing on the photodetector matrix 612 resulting from the light projection 608 emitted from embodiments of the optical waveguide 602 that does not include a projection controller 606. Specifically, the image 802 produced by each optical waveguide 602 is generally circular or oval, and has a substantially constant-intensity. The angle 610 (FIG. 6) of the projected cone 608 is a function of the wavelength of the reflected light 605 received at the input end 603 of the waveguide 602. The thickness (t) 806 (FIG. 8A) of the image area 802 is a function of the wavelength of light transferred through the optical waveguide 602 as well as the type and diameter of the optical waveguide 602. Importantly, once calibrated, the relationship between the diameter (d) 804 of the image 802 projected onto the photodetector matrix 612 and the wavelength of the received light 605 is known. The intensity information of the image 802 on each of the photodetector elements is read or captured by the frame grabber 110 in the controller 118. The controller 118 selects two opposing points or regions of the image 802 and determines the wavelength of the reflected light based upon the distance (d) 804 between the selected segments of the imaged cone of light 608.

The diameter 804 of the projected cone 802 is a function of at least the distance (1) 607 between the output 601 of the optical waveguide 602 and the photodetector matrix 612, as well as the dimensions of the individual optical waveguides. To take these factors into consideration in any measurement, the fiber chromatic sensor 600 is preferably calibrated since obtaining a measurement of the distance 607 may be difficult and such a measurement will not take into account the different characteristics of the individual optical waveguides 602. To periodically calibrate the fiber chromatic sensor 600 in one embodiment, light having a known wavelength is input into the optical waveguides 602 and the resulting projected cone diameter 804 is measured on each of the wavelength-discriminating light detector elements 810 in the matrix 812. Such a calibration method may be used to calibrate simultaneously all of the optical waveguides 602 included in the fiber chromatic sensor 600.

Figure 9:
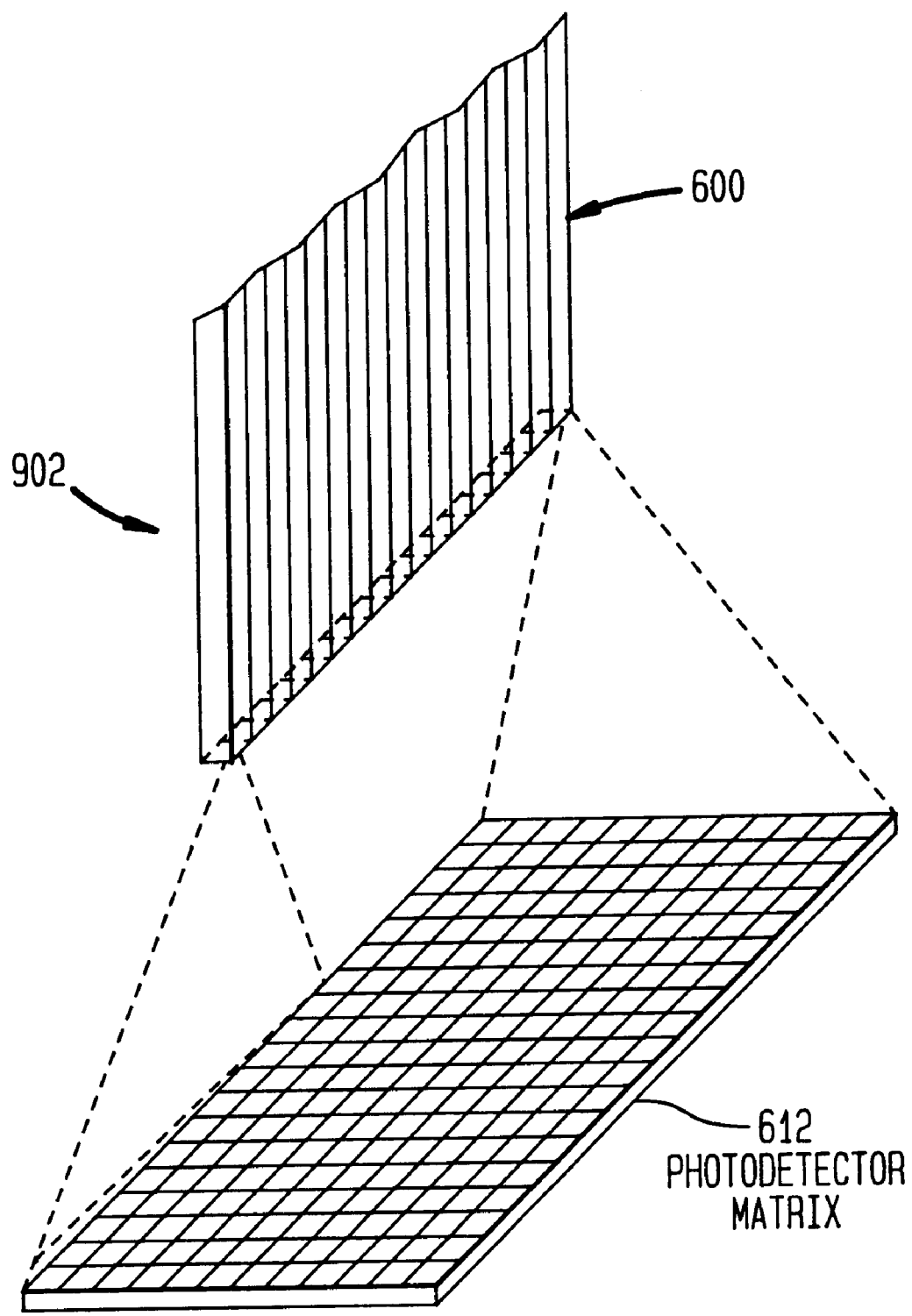
FIG. 9 is a perspective view of an array of fiber chromatic sensors projecting light onto the photodetector matrix illustrated in FIG. 6.

As noted, the fiber chromatic sensor 600 include a linear arrangement of optical waveguides 602 arranged so as to receive reflected light from an associated portion of the workpiece surface 250. FIG. 9 is a perspective view of such an arrangement. Accordingly, numerous such images 802 are projected onto the photodetector matrix 612. In such embodiments wherein a linear array of optical waveguides 602 project light onto the photodetector matrix 612, there may be interference between these projected regions 802 on the photodetector matrix 612. To prevent such interference, the projection controller 606 introduced above may be implemented. A side and cross-sectional view of one embodiment of the projection controller 606 are illustrated in FIGS. 7A and 7B, respectively. The resulting image projected onto the photodetector matrix 612 is shown in FIG. 8B.

Each optical waveguide 602 includes a core 704 surrounded by a coating or cladding 702 that has a refractive index lower than that of the core 704. The cladding serves to reflect or refract the lightwaves in order to confine them to the core 704. In the exemplary embodiment of the projection controller 606 illustrated in FIG. 7A and 7B, the cladding 702 is selectively removed from the optical waveguide 602 so as to obscure the projection of the image ring 802 on the photodetector matrix 612.

Referring to FIGS. 7A and 7B, a region 706 is removed from the cladding 702 on opposing sides of the optical waveguide 602. Likewise, the core 704 is also removed so that the cladding 702 extends a predetermined distance beyond the end of the core 704. Such a projection controller 606 may be formed by any well known technique now or later developed. For example, in one embodiment, the projection controller 606 is formed using lithographic-based techniques. As shown in FIG. 8B, the creation of the projection controller 606 at the projecting end 601 of the optical guide 602 such as that shown in FIGS. 7A and 7B results in the cone of projected light being restricted to two regions 808A and 808B. As a result, neighboring optical waveguides in a linear array 902 will each project similar regions onto the photodetector matrix 612. In this way, the light projected from each of the optical waveguides 602 do not substantially interfere with each other.

Referring to FIG. 8B, each optical waveguide 602 of the fiber chromatic sensor 600 is associated with one or more wavelength-discriminating light detector elements 810 of the photodetector matrix 612. In the exemplary embodiment illustrated in FIGS. 8B and 9, there is a 1-to-1 correspondence between each of the optical waveguides 602 and each of the rows or wavelength-discriminating light detector elements 810 of the photodetector matrix 612. In this embodiment, the projection controller 606 is configured to project the images 808A and 808B onto a single light detector elements 810, which is a single row in the illustrative embodiment.

It should be understood that in alternative embodiments other relationships may be used. For example, in one alternative embodiment, each wavelength-discriminating light detector element 810 includes five rows of photodetector elements. In such an embodiment, each wavelength-discriminating light detector element 810, or every 5 rows of photosensitive elements, are associated with each of the optical waveguides 602.

Figure 10:
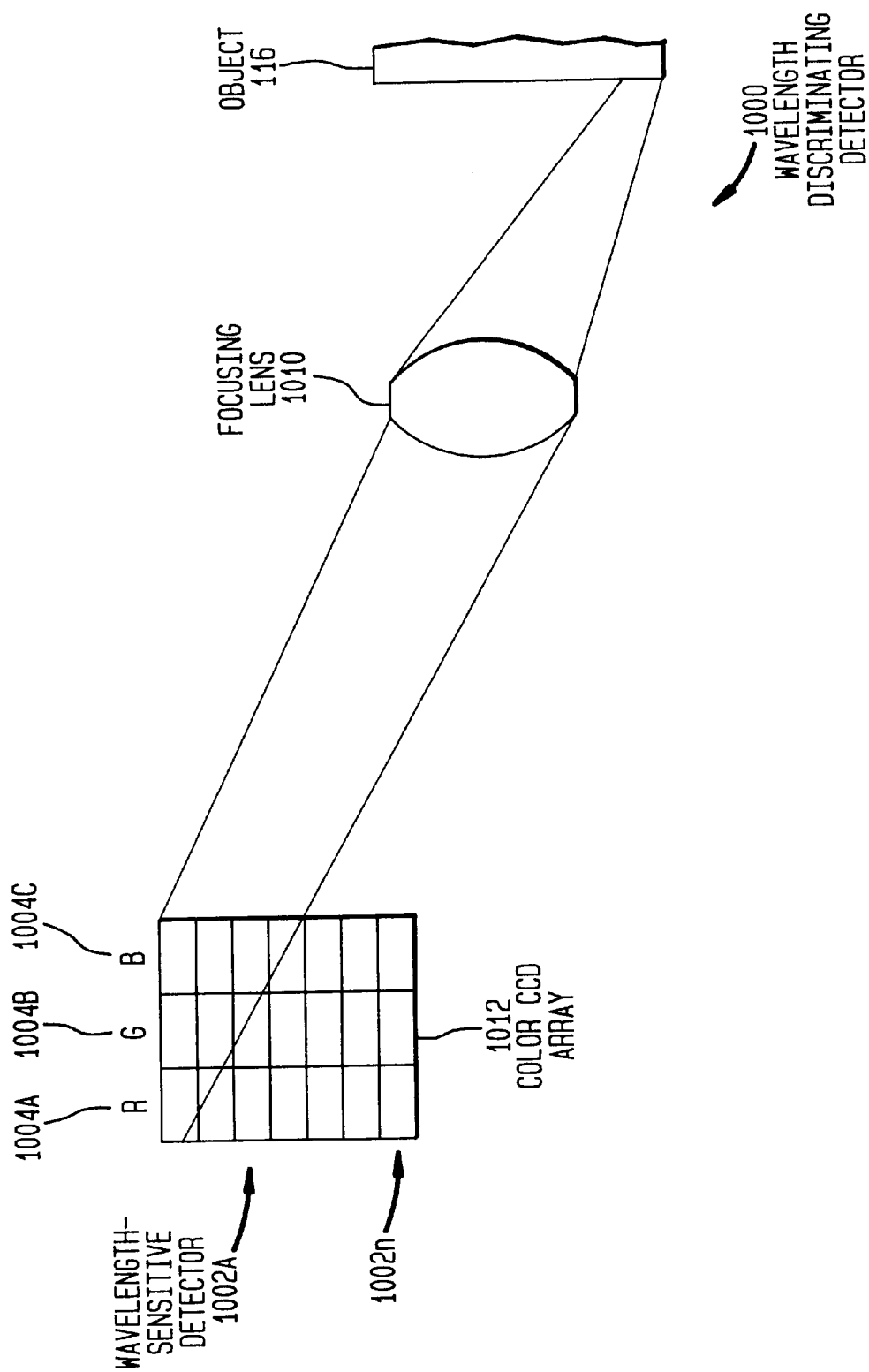
FIG. 10 is a perspective view of an alternative embodiment of the wavelength discriminating detector wherein the photodetector matrix is a color CCD array and the light receiver includes a focussing lens.

FIG. 10 is a perspective view of an alternative embodiment of the wavelength of discriminating detector 204. In this embodiment, the photodetector matrix 212 is a color CCD array or color sensor 1012 and the light receiver 210 includes a focussing lens 1010. The color CCD array 1012 has multiple columns of photosensitive elements. Each photosensitive element in each column is configured to detect a same predetermined range of wavelengths. In the illustrative embodiment, the color sensor 1012 includes three columns of photodetector elements. Column 1004A includes photodetector elements which detect a broad range of wavelengths centered approximately about the wavelength associated with the color red. The column 1004B includes photodetector elements which detect a broad range of wavelengths centered approximately about the wavelength associated with the color green. The column 1004C includes photodetector elements which detect a broad range of wavelengths centered approximately about the wavelength associated with the color blue. Accordingly, the photodetector matrix 1012 is referred to herein as an RGB matrix.

The light reflected from a portion of the workpiece surface 250 is focussed on a particular wavelength-sensitive detector 1002A–1002N through the focussing lens 1010. The controller 118 receives the intensity information from each of the wavelength sensitive detectors 1002 and, based upon the relative intensity of the light projected onto each of the photodetector elements in the wavelength sensitive detector 1002, determines the wavelength of the light reflected from the associated portion of the workpiece's surface 250.

Once calibrated, there is a known relationship between the light which is received from a particular wavelength sensitive detector and the surface of the workpiece from which the light was reflected. As noted, there is also a known relationship between the wavelength of the reflected light and the location of the workpiece surface 250 relative to the wavelength discriminating detector 204.

As one skilled in the relevant art would find apparent, the focussing lens 1010 is selected to provide the appropriate depth of focus and aperture for a given application. Furthermore, the magnification of the focussing lens 1010 is determined from calibrating the system 100.

Figure 11:
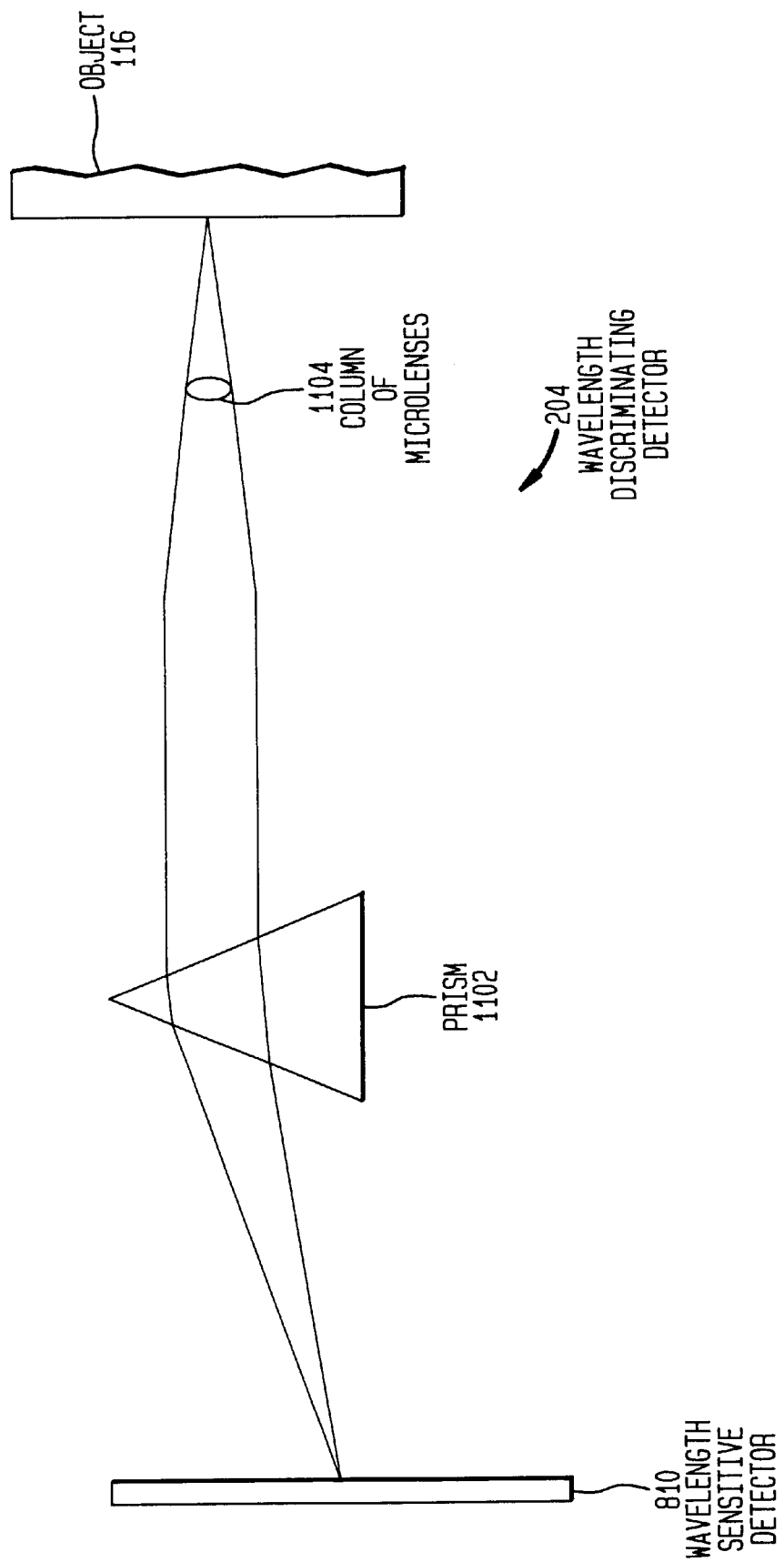
FIG. 11 is a top view of another embodiment of the wavelength discriminating detector wherein the light receiver includes a prism and focussing lens.

FIG. 11 is a top view of an alternative embodiment of the wavelength of discriminating detector 204. In this embodiment, the photodetector matrix includes a wavelength sensitive detector 810 that is functionally similar in function to the photodetector matrix 612 described above. The light receiver 210 includes a column of microlenses 1104 and a prism 1102.

The prism 1102 is any well known prism which deflects different wavelengths through different angles using optical dispersion. The directed light is projected onto a wavelength sensitive detector 810 in a manner similar to that described above with reference to FIGS. 6 and 10. Each of the microlenses in the column 1104 is associated with each row of the wavelength sensitive detector 810. Each microlens is appropriately selected to achieve the necessary focus on the wavelength sensitive detector 810.

As noted, certain embodiments of the system 100 are to be calibrated before performing measurements of a workpiece surface. For example, to calibrate the embodiment of the invention illustrated in FIG. 10, a calibration phase wherein an ideal target surface is scanned is performed before a measurement phase wherein workpieces are measured. During the calibration phase, white light is imaged onto the photodetector matrix 1012 and the intensity values received by the photosensitive elements in each column is received and stored by the controller 118. This is followed by measurements performed using the wavelength filter device 208, during which the intensity values are also received and stored by the controller 118. The difference between these stored values is used to compute the wavelength associated with each position of the filter device 208 and, hence, each position of the light rays across the width 201 of the wavelength-varying collimated light beam 216. This relationship between the receipt intensities and wavelength are stored and later used by the controller 118 during which the workpiece surfaces are measured.

Figure 12A:
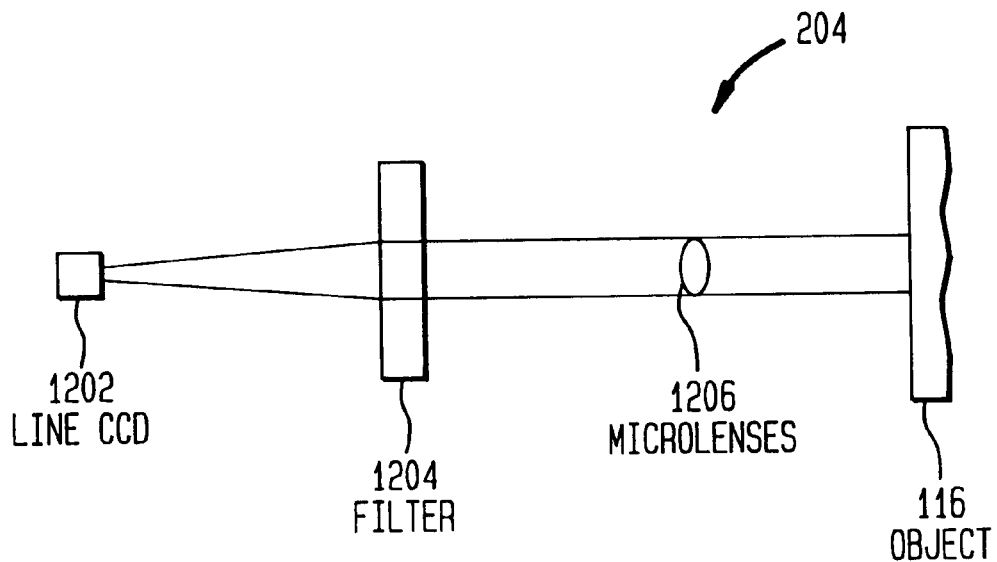
FIG. 12A is a top view of an alternative embodiment of the wavelength discriminating detector incorporating an electronically controlled filter and a column of photosensitive elements.

FIG. 12A is a top view of an alternative embodiment of the wavelength sensitive detector 204. In this embodiment, a line CCD 1202 receives light through an electronically controlled filter 1204. Light reflected from the surface of the object 116 is focused by one of a series of microlenses arranged in a column 1206 such that individual lenses are associated with a particular one or more photosensitive elements in the line CCD 1202. The filter 1204 passes one wavelength over its area at any given time. The filter 1204 is electronically controlled so as to step through a predetermined range of wavelengths, typically 400–700 nm. At each such step only light of the selected wavelength is passed through to the line CCD 1202. Only those elements of the line CCD 1202 which are imaging a point on the object surface which reflects the selected wavelength receives light. Thus, by performing a number of electronic scans of the line CCD 1202, data regarding surface height over a single line contour which is imaged onto the line CCD 1202 may be mapped. As one skilled in the relevant art would find apparent, the selection of the microlenses 1206 wavelengths passed by filter 1204 and the type of line camera 1202 may be selected to achieve a desired result and to accommodate a particular application. For example, line CCD 1202 may be a C-MOS imaging sensor or line CID in alternative embodiments.

Figure 12B:
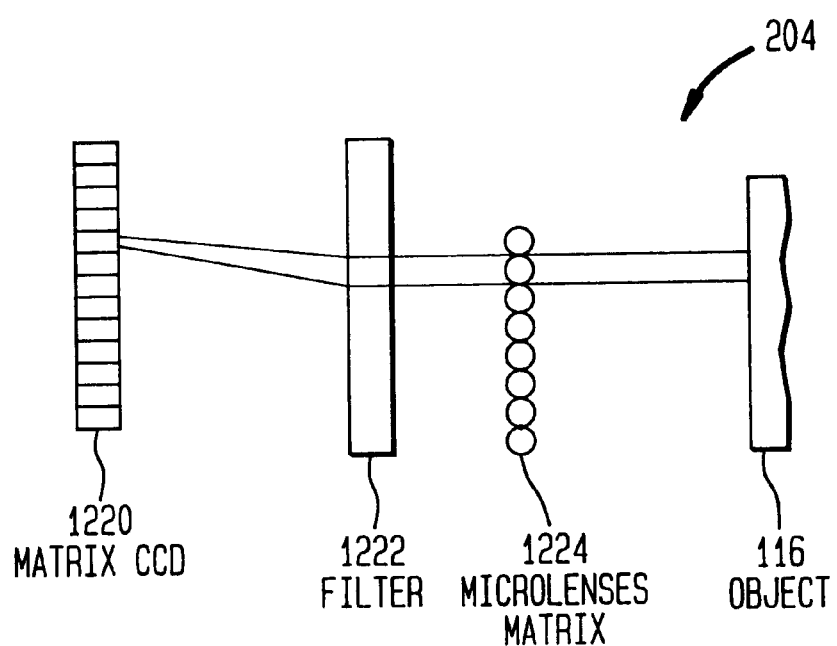
FIG. 12B is a perspective view of an alternative embodiment of the wavelength discriminating detector implementing an electronically controlled filter and an array of photoelectric elements.

FIG. 12B is a top view of still another embodiment of the wavelength sensitive detector 204. In this embodiment, a matrix CCD 1220 receives light through an electronically controlled filter 1222 projected from the surface of the object 116. A matrix 1224 of microlenses is interposed between the filter 1222 and the object 116. This arrangement has a particular advantage of being able to obtain information regarding a two-dimensional area of the surface of the object 116 without any mechanical movement of any element in the system. This further eliminates the time and potential errors associated with the mechanical positioning of components.

In one particular embodiment of the system illustrated in FIG. 12B, two or more projectors 202 project beams to the same area of the object surface from different directions. This results in two or more wavelengths being reflected from each point on the object surface. All such wavelengths could be detected by the filter-based wavelength sensitive detector 204 illustrated in FIG. 12B. In such an embodiment, suitable calibration using measurement objects of known geometry will remove the requirement that the projected beams be parallel as each point in the three-dimensional measurement volume would have a unique pattern of reflected wavelengths.

While various embodiments of the present invention have been described above, it should be understood that they have been presented by way of example only, and not by limitation. For example, the metrology system 100 of the present invention may include additional optical sensor assemblies 112 to measure the same or other portions of the workpiece surface 250. In addition, additional variable wavelength projectors 202 may be independently controlled to successive illuminate a particularly complex surface of the workpiece resulting image of each is successively recorded by the wavelength discriminating detector 204. In addition, the present invention may be scaled to a size and accuracy which is appropriate for the particular workpiece being measured. For example, the present invention may be scaled to measure very intricate parts, such as components and features on a printed circuit board or electronic assembly.

Alternatively, the present invention may be increased in scale to measure larger workpieces such as contoured, free-form automotive body parts. Alternative embodiments also include variations in the width of the wavelength-varying collimated beam 216, and the angle at which it intercepts the workpiece surface 250. This, along with the magnification of the light receivers may be adjusted for a particular application. Thus, the breadth and scope of the present invention are not limited by any of the above exemplary embodiments, but are defined only in accordance with the following claims and their equivalents.

We claim:

1. An optical metrology system for measuring a contour of a workpiece surface, the system comprising:
   a multi-wavelength light projector which projects a light beam in a longitudinal direction in which each wavelength projected identifies a fixed linear displacement within the light beam in a direction perpendicular to the longitudinal direction, regardless of distance from the light projector;
   a wavelength-discriminating detector constructed and arranged so as to determine an intensity of light reflected from the workpiece surface and to detect wavelength-specific characteristics of said reflected light; and
   a processor which determines from a wavelength detected, a depth of a point on the contour of the workpiece surface relative to the wavelength-discriminating detector.

2. The system of claim 1, wherein said multi-wavelength projector comprises:
   a collimated light source constructed and arranged to generate said collimated light beam; and
   a wavelength filter, operatively positioned adjacent to said collimated light source, constructed and arranged to filter predetermined wavelengths of certain ones of said plurality of light rays, thereby generating said wavelength-varying collimated light beam.

3. The system of claim 2, wherein said collimated light source comprises:
   a light source constructed and arranged to emit a light having a plurality of wavelengths; and
   a collimator constructed and arranged to collimate said emitted light so as to generate said collimated light beam.

4. The system of claim 3, wherein said light source comprises a white light source.

5. The system of claim 3, wherein said collimator comprises a cylindrical lens.

6. The system of claim 3, wherein said collimator comprises a parabolic mirror.

7. The system of claim 2, wherein said wavelength filter dynamically filters said collimated light beam.

8. The system of claim 7, wherein said wavelength filter comprises:
   a color filter that filters said collimated light such that said wavelength-varying collimated light comprises light rays varying from approximately 400–700 nanometers (nm).

9. The system of claim 8, wherein said detector is constructed and arranged to discriminate to 1 nm of resolution reflected from the workpiece surface.

10. The system of claim 7, wherein said wavelength filter comprises:
    means for dynamically controlling a plurality of optical filters such that each of said plurality of optical filters temporally filters said collimated light beam.

11. The system of claim 10, wherein said controlling means electronically controls the said plurality of optical filters.

12. The system of claim 11, wherein said controlling means is a tunable liquid crystal display filter.

13. The system of claim 10, wherein said controlling means mechanically controls said plurality of optical filters.

14. The system of claim 2, wherein said wavelength filter filters said collimated light beam such that said wavelength-varying collimated light beam comprises light rays having a wavelength which varies linearly across said plurality of light rays.

15. The system of claim 2, wherein said wavelength filter filters said collimated light beam such that said wavelength-varying collimated light beam comprises light rays having a wavelength which varies non-linearly across said light rays.

16. The system of claim 1, wherein said wavelength discriminating detector comprises:
    a photodetector matrix including a plurality of photosensitive elements forming an array of wavelength-sensitive light detector elements; and
    a light receiver constructed and arranged so as to project light reflected from one or more predetermined locations on the workpiece surface onto said photodetector matrix such that wavelength-specific characteristics and intensity information of said reflected light is recorded by said photodetector matrix.

17. The system of claim 16, wherein said light receiver comprises:
    a fiber chromatic sensor including a plurality of optical waveguides each of which receives and projects a portion of said reflected light onto an associated one of said light detector elements of said photodetector matrix, said projected light having said wavelength-specific characteristics.

18. The system of claim 17, wherein said fiber chromatic sensor further comprises:
    a parallel light receiver, operatively coupled to an input end of each of said plurality of optical waveguides, constructed and arranged to receive light rays of said reflected light that are substantially parallel with an axis of said input end of said optical waveguide.

19. The system of claim 18, wherein each said parallel light receiver comprises:
    a hemispherical lens formed on said input end of said optical waveguide.

20. The system of claim 18, wherein said parallel light receiver comprises:
    a variable refractive index light guide having a predetermined length so as to form a parallel light accepting receiver.

21. The system of claim 17, wherein said fiber chromatic sensor further comprises:
    a projection controller, operatively coupled to an output end of each of said plurality optical waveguides, constructed and arranged to project light transferred through said optical waveguide onto said associated light detection elements of said photodetector matrix.

22. The system of claim 21 wherein said plurality of optical waveguides include a cladding and a core encased within said cladding, and wherein said projection controller is formed through selective removal of said cladding from said output end of said optical waveguide.

23. The system of claim 21, wherein said projection controller causes a substantial portion of said light projected onto said photodetector matrix to be detected only by said associated wavelength-discriminating light detector element of said photodetector matrix.

24. The system of claim 1, wherein said wavelength discriminating detector comprises:
   a photodetector matrix including a plurality of photosensitive elements arranged in columns and rows, with photosensitive elements of each column are configured to detect light having a same range of wavelengths, and photosensitive elements in each of the rows detect light having a different range of wavelengths, wherein one or more rows of said photosensitive elements form a wavelength-sensitive detector; and
   a focussing lens constructed and arranged so as to project light reflected from one or more predetermined locations on the workpiece surface onto an associated wavelength-sensitive detector of said photodetector matrix.

25. The system of claim 24, wherein said photodetector matrix comprises:
   three columns of photosensitive elements, including
      a first column of photodetector elements for detecting a broad range of wavelengths centered approximately about the wavelength associated with the color red,
      a second column of photodetector elements for detecting a broad range of wavelengths centered approximately about the wavelength associated with the color green, and
      a third column of photodetector elements for detecting a broad range of wavelengths centered approximately about the wavelength associated with the color blue.

26. The system of claim 1, wherein said wavelength discriminating detector comprises:
   a photodetector matrix including a plurality of photosensitive elements arranged to form a plurality of wavelength-sensitive detectors; and
   a light receiver, including a prism and a column of microlenses, constructed and arranged so as to project light reflected from one or more predetermined locations on the workpiece surface onto one of said plurality of said wavelength-sensitive detectors associated with each of said predetermined locations such that wavelength-specific characteristics and intensity information of said reflected light is recorded by said plurality of wavelength-sensitive detectors.

27. The system of claim 1, wherein said wavelength discriminating detector comprises:
   a plurality of photosensitive elements arranged in a column so as to receive light reflected from a substantially parallel surface of the workpiece surface;
   an electronically-controlled filter interposed between said column of photosensitive elements and said object surface, said filter allowing a single wavelength of said reflected light to pass through said filter to said column of photosensitive elements, wherein said wavelength is temporally varied in a predetermined manner; and
   a column of microlenses substantially parallel with said column of photosensitive elements interposed between said filter and said object surface, each said microlens focusing the light reflected from the object surface onto an associated photosensitive element of said column of said photosensitive elements.

28. The system of claim 27, wherein said column of photosensitive elements is a line charged-coupled device (CCD).

29. The system of claim 1, wherein said wavelength discriminating detector comprises:
   an array of photosensitive elements arranged in a column so as to receive light reflected from a substantially parallel surface of the workpiece;
   an electronically-controlled filter interposed between said array of photosensitive elements and said object surface, said filter allowing a single wavelength of reflected light to pass through said filter to said array of photosensitive elements, wherein said wavelength is temporally varied in a predetermined manner; and
   an array of microlenses substantially parallel with said array of photosensitive elements interposed between said filter and said object surface, each said microlens focusing the light reflected from the object surface onto an associated photosensitive element of said array of said photosensitive elements.

30. The system of claim 1, wherein said multi-wavelength projector comprises:
   a collimated light source constructed and arranged to generate said collimated light beam; and
   a wavelength filter device, operatively positioned adjacent to said collimated light source, constructed and arranged to filter predetermined wavelengths of certain ones of said plurality of light rays at predetermined intervals.

31. The system of claim 30, wherein said wavelength filter device comprises:
   a first electronically-controlled filter constructed and arranged to pass one wavelength of light at predetermined intervals of time; and
   a second electronically-controlled filter constructed and arranged to pass a predetermined range of wavelengths through a narrow region of said second filter, the position of which is varied across said collimated light beam so as to produce a narrow beam of wavelength-varying light.

32. The system of claim 1, wherein the multi-wavelength light projector dynamically varies wavelength in a predetermined manner across a width of said wavelength-varying collimated light beam; and
   a processor which determines from a wavelength detected, a depth of a point on the contour of the workpiece surface relative to the wavelength-discriminating detector.

33. The system of claim 32, wherein said multi-wavelength projector comprises:
   a collimated light source constructed and arranged to generate said collimated light beam; and
   a wavelength filter, operatively positioned adjacent to said collimated light source, constructed and arranged to dynamically filter predetermined wavelengths of certain ones of said plurality of light rays, thereby generating said wavelength-varying collimated light beam.

34. The system of claim 33, wherein said collimated light source comprises:
   a light source constructed and arranged to emit a light having a plurality of wavelengths; and
   a collimator constructed and arranged to collimate said emitted light so as to generate said collimated light beam.

35. The system of claim 34, wherein said light source comprises a white light source.

36. The system of claim 34, wherein said collimator comprises a cylindrical lens.

37. The system of claim 34, wherein said collimator comprises a parabolic mirror.

38. The system of claim 33, wherein said wavelength filter comprises:
a color filter that filters said collimated light such that said wavelength-varying collimated light comprises light rays varying from approximately 400–700 nanometers (nm).

39. The system of claim 38, wherein said detector is constructed and arranged to discriminate to 1 nm of resolution reflected from the workpiece surface.

40. The system of claim 33, wherein said wavelength filter comprises:
means for dynamically controlling a plurality of optical filters such that each of said plurality of optical filters temporarily filters said collimated light beam.

41. The system of claim 40, wherein said controlling means electronically controls the said plurality of optical filters.

42. The system of claim 41, wherein said controlling means is a tunable liquid crystal display filter.

43. The system of claim 40, wherein said controlling means mechanically controls said plurality of optical filters.

44. The system of claim 32, wherein said wavelength discriminating detector comprises:
a photodetector matrix including a plurality of photosensitive elements forming an array of wavelength-sensitive light detector elements; and
a light receiver constructed and arranged so as to project light reflected from one or more predetermined locations on the workpiece surface onto said photodetector matrix such that wavelength-specific characteristics and intensity information of said reflected light is recorded by said photodetector matrix.

45. The system of claim 44, wherein said light receiver comprises:
a fiber chromatic sensor including a plurality of optical waveguides each of which receives and projects a portion of said reflected light onto an associated one of said light detector elements of said photodetector matrix, said projected light having said wavelength-specific characteristics.

46. The system of claim 45, wherein said fiber chromatic sensor further comprises:
a parallel light receiver, operatively coupled to an input end of each of said plurality of optical waveguides, constructed and arranged to receive light rays of said reflected light that are substantially parallel with an axis of said input end of said optical waveguide.

47. The system of claim 46, wherein each said parallel light receiver comprises:
a hemispherical lens formed on said input end of said optical waveguide.

48. The system of claim 46, wherein said parallel light receiver comprises:
a variable refractive index light guide having a predetermined length so as to form a parallel light accepting receiver.

49. The system of claim 45, wherein said fiber chromatic sensor further comprises:
a projection controller, operatively coupled to an output end of each of said plurality optical waveguides, constructed and arranged to project light transferred through said optical waveguide onto said associated light detection elements of said photodetector matrix.

50. The system of claim 49, wherein said plurality of optical waveguides include a cladding and a core encased within said cladding, and wherein said projection controller is formed through selective removal of said cladding from said output end of said optical waveguide.

51. The system of claim 49, wherein said projection controller causes a substantial portion of said light projected onto said photodetector matrix to be detected only by said associated wavelength-discriminating light detector element of said photodetector matrix.

52. The system of claim 32, wherein said wavelength discriminating detector comprises:
a photodetector matrix including a plurality of photosensitive elements arranged in columns and rows, with photosensitive elements of each column are configured to detect light having a same range of wavelengths, and photosensitive elements in each of the rows detect light having a different range of wavelengths, wherein one or more rows of said photosensitive elements form a wavelength-sensitive detector; and
a focussing lens constructed and arranged so as to project light reflected from one or more predetermined locations on the workpiece surface onto an associated wavelength-sensitive detector of said photodetector matrix.

53. The system of claim 32, wherein said wavelength discriminating detector comprises:
a photodetector matrix including a plurality of photosensitive elements arranged to form a plurality of wavelength-sensitive detectors; and
a light receiver, including a prism and a column of microlenses, constructed and arranged so as to project light reflected from one or more predetermined locations on the workpiece surface onto one of said plurality of said wavelength-sensitive detectors associated with each of said predetermined locations such that wavelength-specific characteristics and intensity information of said reflected light is recorded by said plurality of wavelength-sensitive detectors.

54. The system of claim 32, wherein said wavelength discriminating detector comprises:
a plurality of photosensitive elements arranged in a column so as to receive light reflected from a substantially parallel surface of the workpiece surface;
an electronically-controlled filter interposed between said column of photosensitive elements and said object surface, said filter allowing a single wavelength of said reflected light to pass through said filter to said column of photosensitive elements, wherein said wavelength is temporarily varied in a predetermined manner; and
a column of microlenses substantially parallel with said column of photosensitive elements interposed between said filter and said object surface, each said microlens focusing the light reflected from the object surface onto an associated photosensitive element of said column of said photosensitive elements.

55. The system of claim 32, wherein said wavelength discriminating detector comprises:
an array of photosensitive elements arranged in a column so as to receive light reflected from a substantially parallel surface of the workpiece;
an electronically-controlled filter interposed between said array of photosensitive elements and said object surface, said filter allowing a single wavelength of reflected light to pass through said filter to said array of photosensitive elements, wherein said wavelength is temporarily varied in a predetermined manner; and
an array of microlenses substantially parallel with said array of photosensitive elements interposed between said filter and said object surface, each said microlens focusing the light reflected from the object surface onto an associated photosensitive element of said array of said photosensitive elements.

56. The system of claim 1, the wavelength-discriminating detector further comprising:
   a photodetector matrix including a plurality of photosensitive elements forming an array of wavelength-sensitive light detector elements, and
   a fiber chromatic sensor including a plurality of optical waveguides each of which receives and projects a portion of said reflected light onto an associated one of said light detector elements of said photodetector matrix such that wavelength-specific characteristics and intensity information of said reflected light is recorded by said photodetector matrix; and
   a processor which determines from a wavelength detected, a depth of a point on the contour of the workpiece surface relative to the wavelength-discriminating detector.

57. The system of claim 56, wherein said multi-wavelength projector comprises:
   a collimated light source constructed and arranged to generate said collimated light beam; and
   a wavelength filter, operatively positioned adjacent to said collimated light source, constructed and arranged to filter predetermined wavelengths of certain ones of said plurality of light rays, thereby generating said wavelength-varying collimated light beam.

58. The system of claim 57, wherein said collimated light source comprises:
   a light source constructed and arranged to emit a light having a plurality of wavelengths; and
   a collimator constructed and arranged to collimate said emitted light so as to generate said collimated light beam.

59. The system of claim 57, wherein said wavelength filter filters said collimated light beam such that said wavelength-varying collimated light beam comprises light rays having a wavelength which varies linearly across said plurality of light rays.

60. The system of claim 57, wherein said wavelength filter comprises:
   a color filter that filters said collimated light such that said wavelength-varying collimated light comprises light rays varying from approximately 400–700 nanometers (nm).

61. The system of claim 57, wherein said detector is constructed and arranged to discriminate to 1 nm of resolution reflected from the workpiece surface.

62. The system of claim 56, wherein said fiber chromatic sensor further comprises:
   a parallel light receiver, operatively coupled to an input end of each of said plurality of optical waveguides, constructed and arranged to receive light rays of said reflected light that are substantially parallel with an axis of said input end of said optical waveguide.

63. The system of claim 62, wherein each said parallel light receiver comprises:
   a hemispherical lens formed on said input end of said optical waveguide.

64. The system of claim 62, wherein said parallel light receiver comprises:
   a variable refractive index light guide having a predetermined length so as to form a parallel light accepting receiver.

65. The system of claim 56, wherein said fiber chromatic sensor further comprises:
   a projection controller, operatively coupled to an output end of each of said plurality optical waveguides, constructed and arranged to project light transferred through said optical waveguide onto said associated light detection elements of said photodetector matrix.

66. The system of claim 65 wherein said plurality of optical waveguides include a cladding and a core encased within said cladding, and wherein said projection controller is formed through selective removal of said cladding from said output end of said optical waveguide.

67. The system of claim 65, wherein said projection controller causes a substantial portion of said light projected onto said photodetector matrix to be detected only by said associated wavelength-discriminating light detector element of said photodetector matrix.

68. The system of claim 56, wherein said wavelength discriminating detector comprises:
   a photodetector matrix including a plurality of photosensitive elements arranged in columns and rows, with photosensitive elements of each column are configured to detect light having a same range of wavelengths, and photosensitive elements in each of the rows detect light having a different range of wavelengths, wherein one or more rows of said photosensitive elements form a wavelength-sensitive detector; and
   a focussing lens constructed and arranged so as to project light reflected from one or more predetermined locations on the workpiece surface onto an associated wavelength-sensitive detector of said photodetector matrix.

69. The system of claim 68, wherein said photodetector matrix comprises:
   three columns of photosensitive elements, including
      a first column of photodetector elements for detecting a broad range of wavelengths centered approximately about the wavelength associated with the color red,
      a second column of photodetector elements for detecting a broad range of wavelengths centered approximately about the wavelength associated with the color green, and
      a third column of photodetector elements for detecting a broad range of wavelengths centered approximately about the wavelength associated with the color blue.

70. The system of claim 56, wherein said wavelength discriminating detector comprises:
   a photodetector matrix including a plurality of photosensitive elements arranged to form a plurality of wavelength-sensitive detectors; and
   a light receiver, including a prism and a column of microlenses, constructed and arranged so as to project light reflected from one or more predetermined locations on the workpiece surface onto one of said plurality of said wavelength-sensitive detectors associated with each of said predetermined locations such that wavelength-specific characteristics and intensity information of said reflected light is recorded by said plurality of wavelength-sensitive detectors.

71. The system of claim 56, wherein said wavelength discriminating detector comprises:
   a plurality of photosensitive elements arranged in a column so as to receive light reflected from a substantially parallel surface of the workpiece surface;

an electronically-controlled filter interposed between said column of photosensitive elements and said object surface, said filter allowing a single wavelength of said reflected light to pass through said filter to said column of photosensitive elements, wherein said wavelength is temporarily varied in a predetermined manner; and a column of microlenses substantially parallel with said column of photosensitive elements interposed between said filter and said object surface, each said microlens focusing the light reflected from the object surface onto an associated photosensitive element of said column of said photosensitive elements.

72. The system of claim 56, wherein said multi-wavelength projector comprises:

a collimated light source constructed and arranged to generate said collimated light beam; and a wavelength filter device, operatively positioned adjacent to said collimated light source, constructed and arranged to filter predetermined wavelengths of certain ones of said plurality of light rays at predetermined intervals.

73. The system of claim 72, wherein said wavelength filter device comprises:

a first electronically-controlled filter constructed and arranged to pass one wavelength of light at predetermined intervals of time; and a second electronically-controlled filter constructed and arranged to pass a predetermined range of wavelengths through a narrow region of said second filter, the position of which is varied across said collimated light beam so as to produce a narrow beam of wavelength-varying light.

74. The system of claim 1, the wavelength-discriminating detector further comprising:

a photodetector matrix including a plurality of photosensitive elements arranged to form a plurality of wavelength-sensitive detectors, and a light receiver, including a prism and a column of microlenses, constructed and arranged so as to project light reflected from one or more predetermined locations on the workpiece surface onto one of said plurality of said wavelength-sensitive detectors associated with each of said predetermined locations such that wavelength-specific characteristics and intensity information of said reflected light is recorded by said plurality of wavelength-sensitive detectors; and a processor which determines from a wavelength detected, a depth of a point on the contour of the workpiece surface relative to the wavelength-discriminating detector.

75. The system of claim 74, wherein said multi-wavelength projector comprises:

a collimated light source constructed and arranged to generate said collimated light beam; and a wavelength filter, operatively positioned adjacent to said collimated light source, constructed and arranged to filter predetermined wavelengths of certain ones of said plurality of light rays, thereby generating said wavelength-varying collimated light beam.

76. The system of claim 75, wherein said collimated light source comprises:

a light source constructed and arranged to emit a light having a plurality of wavelengths; and a collimator constructed and arranged to collimate said emitted light so as to generate said collimated light beam.

77. The system of claim 75, wherein said wavelength filter dynamically filters said collimated light beam.

78. The system of claim 77, wherein said wavelength filter comprises:

a color filter that filters said collimated light such that said wavelength-varying collimated light comprises light rays varying from approximately 400–700 nanometers (nm).

79. The system of claim 77, wherein said wavelength filter comprises:

means for dynamically controlling a plurality of optical filters such that each of said plurality of optical filters temporarily filters said collimated light beam.

80. The system of claim 1, the wavelength-discriminating detector further comprising:

a plurality of photosensitive elements arranged in a column so as to receive light reflected from a substantially parallel surface of the workpiece surface, an electronically-controlled filter interposed between said column of photosensitive elements and said object surface, said filter allowing a single wavelength of said reflected light to pass through said filter to said column of photosensitive elements, wherein said wavelength is temporarily varied in a predetermined manner, and a column of microlenses substantially parallel with said column of photosensitive elements interposed between said filter and said object surface, each said microlens focusing the light reflected from the object surface onto an associated photosensitive element of said column of said photosensitive elements; and a processor which determines from a wavelength detected, a depth of a point on the contour of the workpiece surface relative to the wavelength-discriminating detector.

81. The system of claim 80, wherein said multi-wavelength projector comprises:

a collimated light source constructed and arranged to generate said collimated light beam; and a wavelength filter, operatively positioned adjacent to said collimated light source, constructed and arranged to filter predetermined wavelengths of certain ones of said plurality of light rays, thereby generating said wavelength-varying collimated light beam.

82. The system of claim 81, wherein said collimated light source comprises:

a light source constructed and arranged to emit a light having a plurality of wavelengths; and a collimator constructed and arranged to collimate said emitted light so as to generate said collimated light beam.

83. The system of claim 1, the wavelength-discriminating detector further comprising:

an array of photosensitive elements arranged in a column so as to receive light reflected from a substantially parallel surface of the workpiece, an electronically-controlled filter interposed between said array of photosensitive elements and said object surface, said filter allowing a single wavelength of reflected light to pass through said filter to said array of photosensitive elements, wherein said wavelength is temporarily varied in a predetermined manner, and an array of microlenses substantially parallel with said array of photosensitive elements interposed between said filter and said object surface, each said microlens focusing the light reflected from the object surface onto art associated photosensitive element of said array of said photosensitive elements; and a processor which determines from a wavelength detected, a depth of a point on the contour of the workpiece surface relative to the wavelength-discriminating detector.

84. The system of claim 83, wherein said multi-wavelength projector comprises:

a collimated light source constructed and arranged to generate said collimated light beam; and a wavelength filter, operatively positioned adjacent to said collimated light source, constructed and arranged to filter predetermined wavelengths of certain ones of said plurality of light rays, thereby generating said wavelength-varying collimated light beam.

85. The system of claim 84, wherein said collimated light source comprises:

a light source constructed and arranged to emit a light having a plurality of wavelengths; and a collimator constructed and arranged to collimate said emitted light so as to generate said collimated light beam.

86. The system of claim 1, the wavelength-discriminating detector further comprising:

an array of photosensitive elements arranged in a column so as to receive light reflected from a substantially parallel surface of the workpiece;

an electronically-controlled filter interposed between said array of photosensitive elements and said object surface, said filter allowing a predetermined one or more wavelengths of reflected light to pass through said filter to said array of photosensitive elements, wherein said one or more wavelengths are temporally varied in a predetermined manner; and an array of microlenses substantially parallel with said array of photosensitive elements interposed between said filter and said object surface, each said microlens focusing the light reflected from the object surface onto an associated photosensitive element of said array of said photosensitive elements; and a processor which determines from a wavelength detected, a depth of a point on the contour of the workpiece surface relative to the wavelength-discriminating detector.

87. The system of claim 1, the wavelength-discriminating detector further comprising:

a multi-wavelength light projector constructed and arranged to project a wavelength-varying collimated light beam onto the workpiece surface, said collimated light beam having a plurality of substantially parallel light rays each having A predetermined wavelength, said wavelength of a plurality of light rays varying in a predetermined manner across a width of said wavelength-varying collimated light beam;

a wavelength-discriminating detector constructed and arranged so as to determine an intensity of light reflected from the workpiece surface and to detect wavelength-specific characteristics of said reflected light, including, a collimated light source constructed and arranged to generate said collimated light beam, and a wavelength filter device, operatively positioned adjacent to said collimated light source, constructed and arranged to filter predetermined wavelengths of certain ones of said plurality of light rays at predetermined intervals; and a processor which determines from a wavelength detected, a depth of a point on the contour of the workpiece surface relative to the wavelength-discriminating detector.

88. The system of claim 87, wherein said wavelength filter device comprises:

a first electronically-controlled filter constructed and arranged to pass one wavelength of light at predetermined intervals of time; and a second electronically-controlled filter constructed and arranged to pass a predetermined range of wavelengths through a narrow region of said second filter, the position of which is varied across said collimated light beam so as to produce a narrow beam of wavelength-varying light.

89. An optical metrology system for measuring a contour of a workpiece surface, the system comprising:

means for projecting a wavelength-varying collimated light beam in a longitudinal direction onto the workpiece surface, said collimated light beam having a plurality of substantially parallel light rays each having a predetermined wavelength, each wavelength of the plurality of light rays identifying a fixed linear displacement within the light beam in a direction perpendicular to the longitudinal direction regardless of distance from the means for projecting; and means for detecting a an intensity and wavelength-specific characteristics of light reflected from the workpiece surface; and means for determining from a wavelength detected, a depth of a point on the contour of the workpiece surface relative to the wavelength-discriminating detector.

90. The system of claim 89, wherein said multi-wavelength projector comprises:

means for generating said collimated light beam; and means for filtering predetermined wavelengths of certain ones of said plurality of light rays, thereby generating said wavelength-varying collimated light beam.

91. The system of claim 90, wherein said collimated light source comprises:

a light source for emitting a light having a plurality of wavelengths; and collimator means for collimating said emitted light so as to generate said collimated light beam.

92. The system of claim 90, wherein said wavelength filter filters said collimated light beam such that said wavelength-varying collimated light beam comprises light rays having a wavelength which varies linearly across said plurality of light rays.

93. The system of claim 90, wherein said wavelength filter filters said collimated light beam such that said wavelength-varying collimated light beam comprises light rays having a wavelength which varies non-linearly across said light rays.

94. The system of claim 89, wherein said detector means comprises:

a photodetector matrix including a plurality of photosensitive elements forming an array of wavelength-sensitive light detector elements; and a light receiving means for projecting light reflected from one or more predetermined locations on the workpiece surface onto said photodetector matrix such that wavelength-specific characteristics and intensity information of said reflected light is recorded by said photodetector matrix.

95. An optical metrology method for measuring a contour of a workpiece surface, the method comprising:

projecting a wavelength-varying collimated light beam in a longitudinal direction onto the workpiece surface, said collimated light beam having a plurality of substantially parallel light rays each having a predetermined wavelength, each wavelength of the plurality of light rays identifying a fixed linear displacement within the light beam in a direction perpendicular to the longitudinal direction regardless of distance in the longitudinal direction;

detecting an intensity and wavelength-specific characteristics of light reflected from the workpiece surface; and determining from a wavelength detected, a depth of a point on the contour of the workpiece surface relative to the wavelength-discriminating detector.

96. The method of claim 95, wherein said projecting comprises:

generating said collimated light beam; and filtering predetermined wavelengths of certain ones of said plurality of light rays, thereby generating said wavelength-varying collimated light beam.

97. The method of claim 96, wherein said generating comprises:

emitting a light having a plurality of wavelengths; and collimating said emitted light so as to generate said collimated light beam.

98. The method of claim 96, wherein said filtering comprises:

dynamically filtering said collimated light beam.

99. The method of claim 98, wherein said filtering comprises:

dynamically controlling a plurality of optical filters such that each of said plurality of optical filters temporarily filters said collimated light beam.

100. The method of claim 96, wherein said wavelength-varying collimated light beam comprises light rays having a wavelength which varies linearly across said plurality of light rays.

101. The method of claim 96, wherein said wavelength-varying collimated light beam comprises light rays having a wavelength which varies non-linearly across said light rays.

102. The method of claim 95, wherein said detecting comprises:

projecting light reflected from one or more predetermined locations on the workpiece surface onto a photodetector matrix including a plurality of photosensitive elements forming an array of wavelength-sensitive light detector elements.

* * * * *